US005831193A

United States Patent [19]

Suzuki et al.

[11] Patent Number: 5,831,193

[45] Date of Patent: Nov. 3, 1998

[54] METHOD AND DEVICE FOR FORMING A TONE WAVEFORM BY COMBINED USE OF DIFFERENT WAVEFORM SAMPLE FORMING RESOLUTIONS

[75] Inventors: Hideo Suzuki; Motoichi Tamura, both of Hamamatsu, Japan

[73] Assignee: Yamaha Corporation, Hamamatsu, Japan

[21] Appl. No.: 666,671

[22] Filed: Jun. 18, 1996

[30] Foreign Application Priority Data

| | | | |
|---|---|---|---|
| Jun. 19, 1995 | [JP] | Japan | 7-173940 |
| Jun. 19, 1995 | [JP] | Japan | 7-173941 |

[51] Int. Cl.[6] .............................. G06F 7/38; G06F 17/10; G10H 1/08; G10H 7/12

[52] U.S. Cl. ................................ 84/603; 84/607; 84/625; 364/715.02; 364/723; 364/724.1

[58] Field of Search ..................... 84/603–607, 622–633, 84/DIG. 9, 600–602; 364/715.02, 723, 724.1

[56] References Cited

U.S. PATENT DOCUMENTS

| | | | |
|---|---|---|---|
| Re. 33,558 | 3/1991 | Katoh | 84/605 |
| 4,632,001 | 12/1986 | Suzuki | 84/603 |
| 4,701,956 | 10/1987 | Katoh | 364/723 X |
| 4,719,833 | 1/1988 | Katoh et al. | 364/723 X |
| 4,794,837 | 1/1989 | Katoh . | |
| 4,916,996 | 4/1990 | Suzuki et al. | 84/603 |
| 5,050,474 | 9/1991 | Ogawa et al. | 84/603 |
| 5,086,475 | 2/1992 | Kutaragi et al. | 84/603 X |
| 5,168,116 | 12/1992 | Iizuka | 84/603 |
| 5,250,748 | 10/1993 | Suzuki | 84/DIG. 9 |
| 5,319,151 | 6/1994 | Shiba et al. | 84/603 |
| 5,329,062 | 7/1994 | Kaneko | 84/603 |
| 5,340,940 | 8/1994 | Iizuka et al. | 84/603 X |
| 5,342,990 | 8/1994 | Rossum | 84/603 |
| 5,396,238 | 3/1995 | Setoguchi et al. | 84/600 X |
| 5,416,264 | 5/1995 | Toda et al. | 84/603 |
| 5,525,748 | 6/1996 | Kuribayashi et al. | 84/602 |
| 5,567,901 | 10/1996 | Gibson et al. | 84/603 |
| 5,625,158 | 4/1997 | Ichiki | 84/603 |
| 5,639,978 | 6/1997 | Saito | 84/603 |

FOREIGN PATENT DOCUMENTS

| | | |
|---|---|---|
| 0 199 192 | 10/1986 | European Pat. Off. . |
| 0 474 177 | 3/1992 | European Pat. Off. . |
| WO 80/01215 | 6/1980 | WIPO . |

*Primary Examiner*—Stanley J. Witkowski
*Attorney, Agent, or Firm*—Graham & James LLP

[57] ABSTRACT

The number of waveform samples per unit time, i.e., waveform sample forming resolution is variably set depending on characteristics of a tone to be generated, such as construction of harmonic components in the tone. The number of waveform samples per unit time is increased for a tone or portion (e.g., attack portion) of a tone containing a relatively great number high-order harmonic components. Conversely, for a tone or portion (e.g., sustain portion) of a tone containing fewer high-order harmonic components, the number of waveform samples per unit time is decreased. By thus variably setting the waveform sample resolution, a process for arithmetically forming waveform sample data can be performed efficiently without involving significant waste. In cases where a plurality of tone generating channels are provided, the waveform sample forming resolution may be variably set independently for each of the channels. Also, in applications where the waveform sample data are to be stored in a waveform memory, effective data compression can be achieved by storing the waveform data with the waveform sample forming resolution variably set for each of different waveform segments.

28 Claims, 15 Drawing Sheets

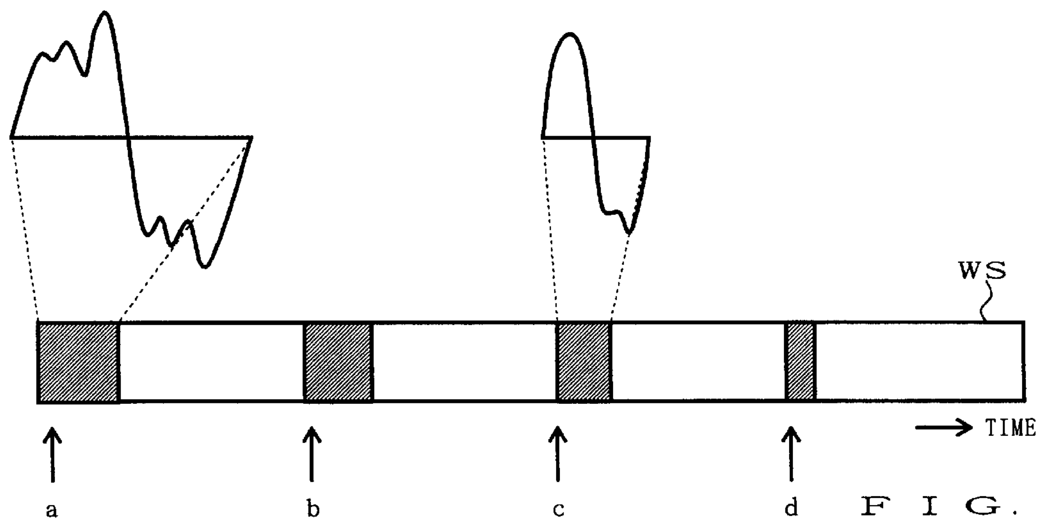
FIG. 6
FIG. 7A
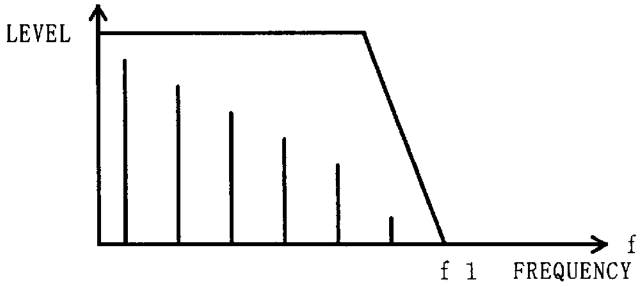
FIG. 7B
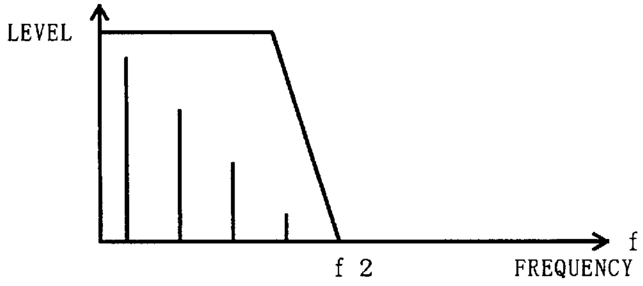
FIG. 7C
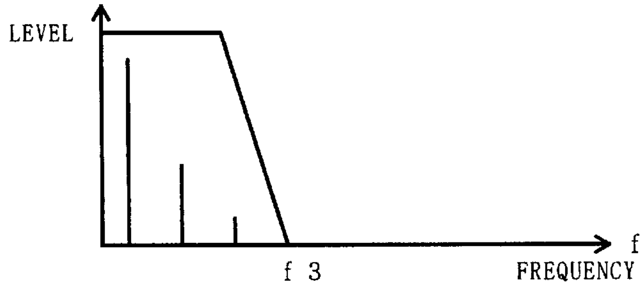
FIG. 7D
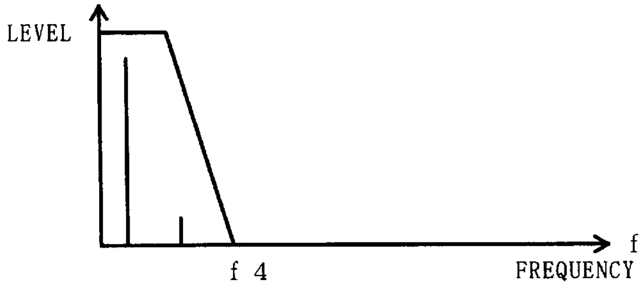

METHOD AND DEVICE FOR FORMING A TONE WAVEFORM BY COMBINED USE OF DIFFERENT WAVEFORM SAMPLE FORMING RESOLUTIONS

BACKGROUND OF THE INVENTION

The present invention relates to a method for forming tone waveform samples on the basis of waveform forming calculations performed via an arithmetic processing device.

The present invention also relates to a method for compressing waveform data to be stored in a memory in an electronic musical instrument or other tone reproducing device provided with a waveform-memory-based tone generator.

In conventional tone generators capable of simultaneously generating tones in a plurality of channels where tone waveform samples are arithmetically formed by use of an arithmetic processing device, the number of waveform samples to be arithmetically formed per predetermined unit time (hereinafter referred to as a "waveform sample forming resolution") in the individual tone generating channels is kept fixed for each of the channels. Also, the waveform sample forming resolution is kept fixed from the start to end of each tone, and no conventionally-known tone generators are designed to allow the waveform sample forming resolution to be varied during arithmetical formation of a tone.

The term "waveform sample forming resolution" is used herein as a basic measure in describing the characteristic concept of the present invention, and a variation in the number of waveform samples to be arithmetically formed per predetermined unit time will lead to a variation of the upper limit frequency in the frequency band covered by a generated tone.

If the waveform sample forming resolution is expressed in terms of the number of samples to be formed per second (equivalent sampling frequency), the upper limit frequency will correspond to about ½ of the sampling frequency according to the known sampling theorem. For example, if 128 samples are arithmetically formed for each unit time of $1/375$ second, the equivalent sampling frequency will be $128 \times 375 = 48$ (kHz) so that a generated tone can contain frequency components up to an upper limit of 24 kHz. In general, the tone quality depends on the waveform sample forming resolution because the sampling frequency is a factor determining the quality of a digital tone.

The waveform sample forming resolution will directly determine an amount of tone waveform forming calculations per unit time, and the amount of necessary calculations will increase in direct proportion to the number of samples per unit time since the per-sample calculation does not differ significantly from one sample to another. That is, if the waveform sample forming resolution is raised to enhance the quality of a tone, the amount of necessary calculations will increase and the calculations will sometimes become even impossible without the provision of large-scale circuitry. So, the trade-off between the waveform sample forming resolution and the circuitry scale has been an important factor in designing the tone generator.

However, as known, respective frequency bands of tone waveforms formed in the individual tone generating channels generally differ depending on colors of tones to be generated. Thus, if a common fixed waveform sample forming resolution is used in the channels, there would arise a problem that calculations are wastefully performed up to an unnecessary frequency band for each of the channels forming a tone waveform that does not necessarily require a wide frequency band. If a waveform sample forming resolution is set to correspond to a tone waveform that does not require a wide frequency band, there would arise another problem that tone waveform samples requiring a wide frequency band can not be formed.

Further, in the case of a waveform from the start to end (start-to-end-waveform) of a decay tone, the attack portion covers a wide frequency band containing many harmonic components, while the sustain portion where attenuation has progressed to a considerable degree covers a less wide frequency band containing fewer harmonic components. If, in this case, a fixed waveform sample forming resolution is used for formation of a tone, calculations are wastefully performed up to an unnecessary frequency band for such a portion requiring no wide frequency band. Also, if a waveform sample forming resolution is set to correspond to a portion of the waveform that does not require a wide frequency band, there would arise the problem that tone waveform samples can not be formed for another portion requiring a wide frequency band.

Further, in the waveform-memory-based tone generator where a plurality of tone waveforms are pre-recorded in the waveform memory, many tone waveforms generally have to be recorded if high-quality tones are desired, thus requiring a great waveform memory capacity. To address this inconvenience, there has been proposed various approaches so far to reduce the necessary memory capacity for storing the tone waveforms, one example of which is based on the fact that different tone waveforms normally have different frequency components. Specifically, it is proposed that in the case of a tone waveform consisting of low-frequency components, the tone waveform should be sampled during recording by use of a low sampling frequency so as to reduce the number of sampling data so that the necessary waveform memory capacity is reduced. However, the recording sampling frequency may sometimes be varied for each of the different tone waveforms, in which case if any one of the tone waveforms is read out from the waveform memory in accordance with predetermined frequency numbers (i.e., numerical numbers defining a pitch of a reproduced tone, which will hereinafter be referred to as "F numbers") determined solely by a note number to be sounded, relationships between the sampling frequency and readout timing would substantially differ among the tone waveforms, thus presenting a problem that a tone of a desire pitch can not be obtained.

In addition, with the waveform-memory-based tone generator, where the use of F numbers allows a reproducing frequency to be finely controlled, a tone waveform can be read out at a desired pitch by just controlling the F numbers in accordance with any of the recording sampling frequencies so as to compensate for a difference in the recording sampling frequencies.

An attempt to reduce the necessary waveform memory capacity has been so far made in the above-mentioned manners.

Further, because of the fact that while high-frequency components such as harmonic components of a fundamental wave are contained in the attack portion of a waveform of a decay tone, the sustain portion has the harmonic components almost completely attenuated, what is left unattenuated in the sustain portion would be almost nothing but the fundamental wave, so that the sustain portion would consist of frequency components lower than the attack portion. Further, in the case of a tone color that affords an effect of gradually increasing brightness, the waveform has frequency components becoming increasingly higher although it does not have not-so-high frequency components at the beginning of sounding of a corresponding tone.

However, in the past, the sampling frequency used in recording a start-to-end waveform of a tone was fixed to such a frequency to permit proper sampling of the highest-frequency component without involving unwanted aliasing noise, although the sampling frequency was made variable among different tone waveforms. With such a fixed recording sampling frequency, even waveform data of an unnecessary frequency band would wastefully be recorded into the waveform memory, with the result that the waveform memory could not be used efficiently.

SUMMARY OF THE INVENTION

It is therefore a first object of the present invention to provide a tone generating method for forming tone waveform samples on the basis of waveform forming calculations performed via an arithmetic processing device, which is capable of forming tone waveform samples of a wide frequency band efficiently without involving wasteful calculations.

It is a second object of the present invention to provide a waveform data compressing method applicable to an electronic musical instrument provided with a waveform-memory-based tone generator or other tone reproducing device, which is capable of effectively compressing waveform data to be recorded into the waveform memory.

In order to accomplish the first object, the present invention provides a tone generating method for forming tone waveform samples on the basis of waveform forming calculations via an arithmetic processing device, which is characterized in that a resolution of the waveform forming calculations is determined independently for each of a plurality of tone generating channels in accordance with a character of a waveform to be formed in the channel and importance of the channel relative to other the channel.

The present invention also provides a tone generating method for forming tone waveform samples on the basis of waveform forming calculations via an arithmetic processing device, which is characterized in that a resolution of the waveform forming calculations is varied during the calculations in accordance with a time-varying ratio of harmonic content in a tone.

The present invention also provides a tone generating method wherein tone forming calculations are performed for a plurality of tone generating channels so as to form waveform data of a plurality of tones corresponding to the channels, and the method comprises a tone control step of generating first control data for, for each of the tone generating channels, designating a tonal characteristic of the waveform data to be formed in the channel, a calculation control step of generating second control data for, for each of the tone generating channels, designating a specific number of tone samples to be formed in the channel per unit time, a tone formation step of, for each of the tone generating channels, arithmetically forming waveform data of the tone corresponding to the channel in accordance with the tonal characteristic designated by the first control data and at a sample forming rate designated by the second control data, and a step of generating tones on the basis of the waveform data formed in the tone formation step for the plurality of tone generating channels.

In the above-mentioned tone generating method, the calculation control step generates second control data in correspondence with a time-varying tonal characteristic of waveform data to be formed in each of the channels. The calculation control step varies the second control data to be generated in correspondence with a time-variation in the tonal characteristic of the waveform data to be formed in each of the tone generating channels. Further, the first control data includes pitch information that designates a pitch of a tone to be generated in each of the tone generating channels, and the tone formation step converts the pitch information of each of the channels into a phase variation rate of the tone to be generated in accordance with the sample forming rate designated by the second control data.

The present invention also provides a tone generating method for simultaneously generating at least two tones, which comprises a first formation step of forming samples of a first tone waveform containing a great number of high-frequency components at a forming rate of N samples per unit time, a second formation step of forming samples of a second tone waveform containing a small number of high-frequency components at a forming rate of M samples per unit time (where M is smaller than N), a step of subjecting the M samples of the second tone waveform to an interpolation operation so as to provide N samples of the second tone waveform, a mix step of sequentially adding the N samples of the first second tone waveform and the N samples of the second second tone waveform sample by sample so as to provide N samples of a mixed tone waveform, and a step of generating tones on the basis of the mixed tone waveform provided by the mix step.

The present invention also provides a tone generating method wherein tone forming calculations are performed for a plurality of tone generating channels so as to form waveform data of a plurality of tones corresponding to the channels, and which comprises a division step of dividing the plurality of tone generating channels into first and second groups, a first formation step of forming N samples of a tone waveform per unit time for each of the channels of the first group and sequentially adding the N samples between the channels so as to provide N samples of a first mixed waveform, a second formation step of forming M samples of a tone waveform per unit time for each of the channels in the second group and sequentially adding the M samples between the channels so as to provide M samples of a second mixed waveform (where M is smaller than N), a step of subjecting the M samples of the second tone waveform to an interpolation operation so as to provide N samples of the second tone waveform, a mix step of sequentially adding the N samples of the first second tone waveform and the N samples of the second second tone waveform sample by sample, so as to provide N samples of a mixed tone waveform, and a step of generating tones on the basis of the mixed tone waveform provided by the mix step.

Because a waveform sample forming resolution can be determined, for each of the tone generating channels, depending on whether or not a tone waveform to be sounded therein is of a wide frequency band, or depending on relative importance of the corresponding tone, the present invention can arithmetically form tone waveform samples irrespective of whether a tone waveform to be sounded is of a wide frequency band or narrow frequency band, without involving wasteful calculations. Further, because the waveform sample forming resolution is raised for the attack portion of a decay tone in order to form a greater number of waveform samples and is lowered for the sustain portion to form a smaller number of waveform samples, wasteful calculations can be avoided so that waveform samples from the start to end of a tone can be formed efficiently without involving wasteful calculations. By thus saving waveform calculations for a specific tone generating channel, it is possible to increase the amount of waveform calculations for another tone generating channel to thereby enhance the quality of a tone generated in that channel, and the number of channels capable of simultaneously generating tones can be increased. Moreover, because the invention can control the number of tone waveform samples to be formed per unit time independently for each channel, tones can be generated with different qualities in the channels. Also, it is allowed to reduce the amount of calculations for a specific channel which will present no significant effect even though the tone generated therein is of low quality.

Further, in order to accomplish the second object, the present invention provides a waveform data compressing method which comprises an input step of inputting a waveform lasting for a predetermined period, a control step of varying a recording sampling frequency during the predetermined period, a sampling step of sampling the waveform by use of the recording sampling frequency so as to obtain waveform data, and a write step of sequentially writing into a memory the waveform data obtained by the sampling step.

In the above-mentioned waveform data compressing method, the recording sampling frequency is varied stepwise at predetermined timing during the predetermined period. Alternatively, the recording sampling frequency may be varied gradually at predetermined timing during the predetermined period.

The present invention also provides a waveform data compressing method which comprises an input step of inputting a waveform lasting for a predetermined period, a control step of varying a recording sampling frequency during the predetermined period, a sampling step of sampling the waveform by use of the recording sampling frequency so as to obtain waveform data, a recording step of sequentially recording into a waveform memory the waveform data obtained by the sampling step, a designation step of designating a reproducing rate, a generation step of generating variation data corresponding to a pitch variation occurring in the waveform data recorded in the waveform memory due to a variation of the recording sampling frequency by the control step, a modification step of modifying the reproducing rate designated by the designation step with the variation data, and a reproduction step of reading the waveform memory at a rate corresponding to the reproducing rate modified by the modification step.

In the above-mentioned waveform data compressing method, if the waveform data are read out at a fixed rate, the variation data is data indicative of a frequency in a logarithmic region represented by the waveform data. The modification step performs addition or subtraction between the reproducing rate and the variation data.

According to the waveform data compressing method arranged in the above-mentioned manner, the sampling frequency is raised for the attack portion of a tone to be recorded where the waveform data contain high frequency components and lowered for the sustain portion etc. where the waveform data contain not-so-high frequency components, so that waveform sample data to be recorded in the waveform memory can be effectively reduced in quantity and compressed to a substantial degree. As a result, the present invention can reduce a necessary storage capacity of the waveform memory and use the memory with enhanced efficiency.

For better understanding of the above and other features of the present invention, the preferred embodiments of the invention will be described in detail below with reference to the accompanying drawings.

BRIEF DESCRIPTION OF THE DRAWINGS

In the accompanying drawings:

FIG. 6 illustrates an example of waveform data from the start to end of a tone;

FIGS. 7A to 7D illustrate frequency spectra at various points of the waveform data of FIG. 6;

DETAILED DESCRIPTION OF THE PREFERRED EMBODIMENTS

Figure 1:
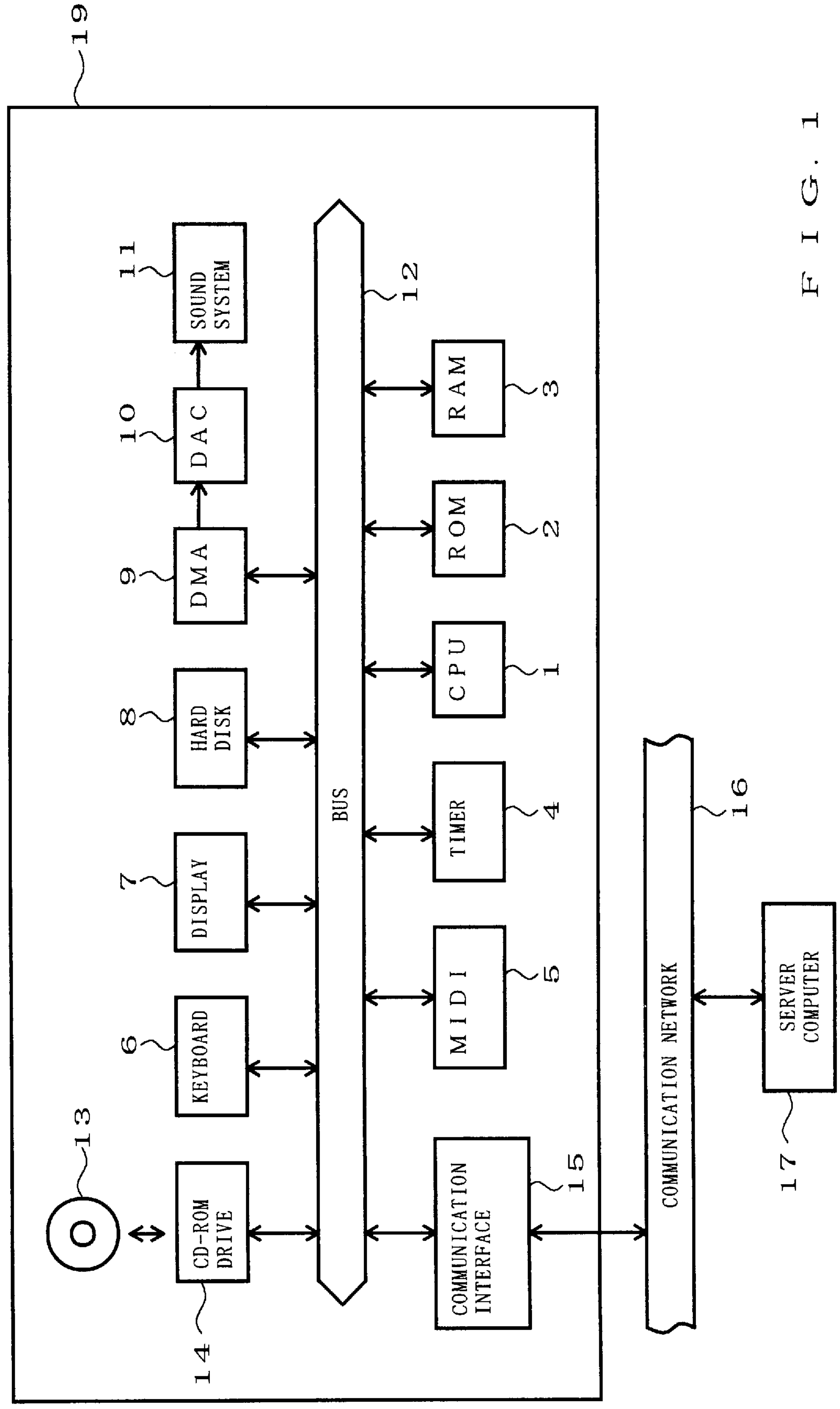
FIG. 1 is a block diagram illustrating a exemplary structure of a tone generating device used to implement a tone generating method of the present invention.

FIG. 1 is a block diagram illustrating a structural example of a tone generating device 19 used to implement a tone generating method of the present invention.

The tone generating device 19 in FIG. 1 comprises: an arithmetic processing unit (CPU) 1 which executes an application program or the like to perform various control, arithmetical formation of tone waveform samples, etc.; a read-only memory (ROM) 2 having stored therein an operating program for the CPU 1, preset tone color data and the like; a random access memory (RAM) 3 having a working memory area for the CPU 1 and storage areas for tone color data etc.; a timer 4 for keeping time and indicating timer interrupt timing to the CPU 1; a MIDI interface 5 via which a MIDI event is input to the device 19 and a generated MIDI event is output from the device 19; and a keyboard 6, similar to that of an ordinary personal computer, having keys of English and Japanese alphabets, numerals, marks, etc. As well known in the art, "MID" is an acronym of musical instrument digital interface.

The tone generating device 19 further comprises: a display (monitor) 7 via which a user is allowed to dialog with the device 19; a hard disk (HDD) 8 which has installed therein application programs such as a program for generating tones and also has recorded therein tone waveform data to be used to arithmetically form tone waveform samples; a reproduction section (DMA: Direct Memory Access) 9 which, without intervention of the CPU 1, permits direct transfer of tone waveform sample data to or from one of the areas of RAM 3 designated by the CPU 1; a digital-to-analog (D/A) converter (DAC) 10 for converting tone waveform sample data into analog tone signals; and a sound system 11 including amplifiers and speakers for audibly reproducing or sounding the analog tone signals supplied from the D/A converter 10.

In the hard disk 8, there may be stored various other data such as automatic performance data and chord progression data and the above-mentioned operating program. By prestoring the operating program in the hard disk 8 rather than in the ROM 2 and loading the operating program into the RAM 3, the CPU 1 can operate in exactly the same way as where the operating program is stored in the ROM 2. This greatly facilitates version-up of the operation program, addition of an operating program, etc. A CD-ROM (compact disk) 13 may be used as a removably-attachable external recording medium for recording various data such as automatic performance data, chord progression data and tone waveform data and an optional operating program. Such an operating program and data stored in the CD-ROM 13 can be read out by a CD-ROM drive 14 to be transferred for storage into the hard disk 8. This facilitates installation and version-up of the operating program. The removably-attachable external recording medium may be other than the CD-ROM, such as a floppy disk and magneto optical disk (MO).

A communication interface 15 may be connected to a bus 12 so that the device 19 can be connected via the interface 15 to a communication network 16 such as a LAN (local area network), internet and telephone line network and can also be connected to an appropriate sever computer 17 via the communication network 16. Thus, where the operating program and various data are not contained in the hard disk 8, these operating program and data can be received from the server computer 17 and downloaded into the hard disk 8. In such a case, the tone generating device 19, a "client", sends a command requesting the server computer 17 to download the operating program and various data by way of the communication interface 15 and communication network 16. In response to the command, the server computer 17 delivers the requested operating program and data to the tone generating device 19 via the communication network 16. The tone generating device 19 completes the necessary downloading by receiving the operating program and data via the communication network 15 and storing these into the hard disk 8.

It should be understood here that the tone generating device 19 may be implemented by installing the operating program and various data corresponding to the present invention in a commercially available personal computer. In such a case, the operating program and various data corresponding to the present invention may be provided to users in a recorded form on a recording medium, such as a CDROM or floppy disk, which is readable by the personal computer. Where the personal computer is connected to a communication network such as a LAN, the operating program and various data may be supplied to the personal computer via the communication network similarly to the above-mentioned.

Figure 2:
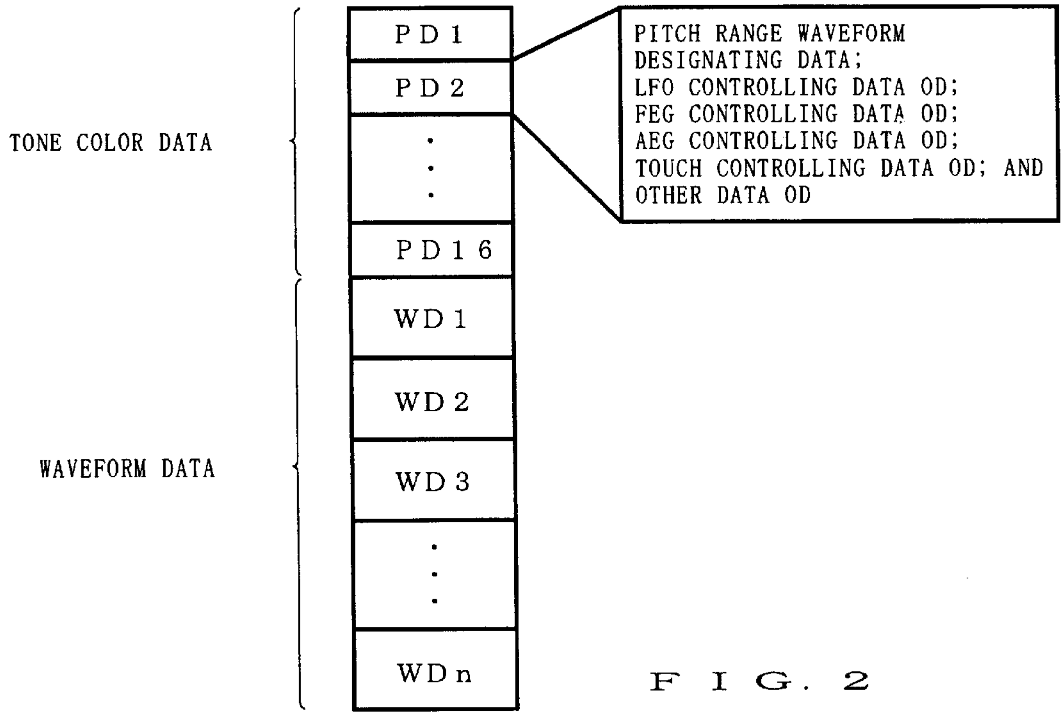
FIG. 2 is a diagram illustrating tone color data and waveform data areas provided in a RAM of FIG. 1.
Figure 3:
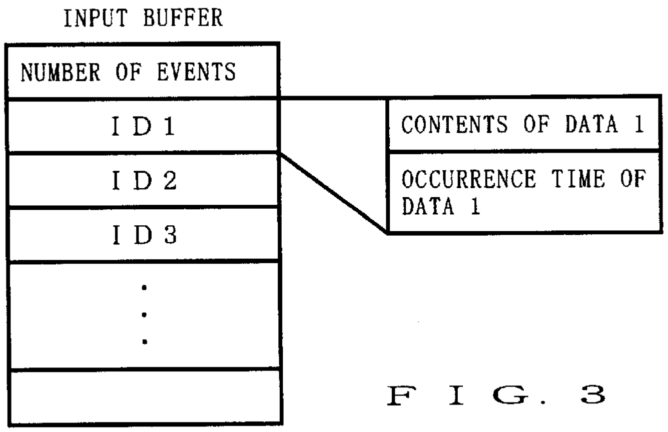
FIG. 3 is a diagram illustrating an input buffer area provided in the RAM of FIG. 1.
Figure 4:
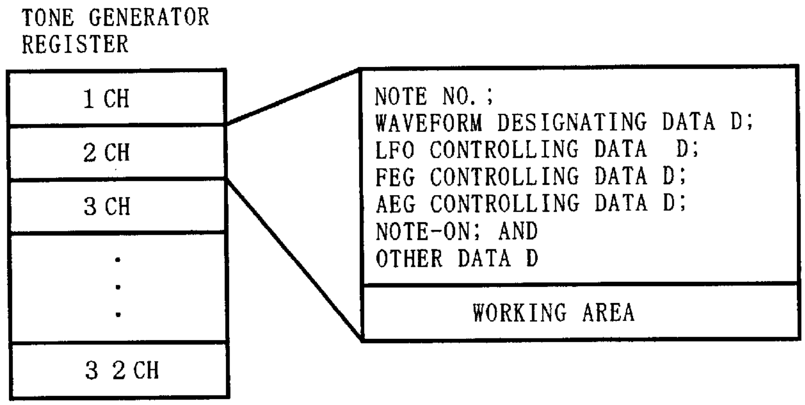
FIG. 4 is a diagram illustrating a tone generator register area provided in the RAM of FIG. 1.

FIGS. 2 to 5 illustrate various register areas that are provided in the RAM 3, of which FIG. 2 illustrates areas where are stored various data and waveform data, FIG. 3 illustrates an input buffer where are stored MIDI messages input via the MIDI interface 5, and FIG. 4 illustrates a tone generator register area where are stored various parameters necessary for generating tone waveform samples of a plurality of channels. In the area of FIG. 2, there are stored 16 kinds of tone color data "PD1, PD2, . . . , PD16" and n kinds of waveform data "WD1, WD2, . . . WDn". OPEG (original pitch envelope) waveforms to be later described are stored along with the waveform data "WD1, WD2, . . . WDn" in corresponding relations thereto.

Each of the tone color data is comprised of data designating a waveform of a given pitch range (pitch range waveform designating data); data for controlling a low frequency oscillator (LFO) to be used for imparting vibrato effect or the like (LFO controlling data OD); data for controlling generation of a filter envelope to time-vary a tone color filter characteristic (FEG controlling data OD); data for controlling generation of a tone volume envelope to control a tone volume variation characteristic (AEG controlling data OD); touch controlling data for varying a rising speed of tone or the like in accordance with a detected key-touch velocity (touch controlling data OD); and other data including waveform-sample-forming-resolution controlling data (other data OD). "OD" attached at the end of each of the above-mentioned data stands for "original data" before being subjected to control such as modulation.

In the input buffer area of FIG. 3, MIDI event data ID1, ID2, ID3, . . . , indicative of various events such as note-on and note-off events and input via the MIDI interface 5 are sequentially written. By reading out these MIDI event data ID1, ID2, ID3, . . . , an event process is performed in the tone generating device so as to form tone waveform samples corresponding to the read-out MIDI event data. Each of the MIDI event data ID1, ID2, ID3, . . . is comprised of data indicative of the contents of the MIDI event and time at which the event data occurred (data occurrence time or event occurrence time). The data occurrence time can be determined by reading current time kept by the timer 4 when the MIDI event data is received.

The area shown in FIG. 4 is used as the tone generator register area comprised of registers provided for a plurality of tone generating channels (in this example, 32 channels CH1 to CH32), and each of the registers has stored therein various tone parameters for controlling a tone waveform sample to be formed in the corresponding tone generating channel. In each of the registers (channel registers), there are stored a note number of a tone to be formed in the corresponding channel, data designating any of the waveform data stored in the RAM 3 (waveform designating data D), LFO controlling data D, filter envelope controlling data (FEG controlling data D), tone volume envelope controlling data (AEG controlling data D), note-on data and other data D. Each of the channel registers also includes a working area to be used during arithmetical formation of a tone sample in the corresponding tone generating channel. "D" attached at the end of each of the above-mentioned data is an abbreviation of data and represents data already channel-assigned for sounding of a tone, as distinguished from the above-mentioned original data (OD).

The waveform designating data D, LFO controlling data D, FEG controlling data D and AEG controlling data D of each of the tone generating channels are tone forming data obtained by processing any of the tone color data PD1, PD2, PD3, . . . PD16 on the basis of the contents of the MIDI event.

Figures 5A, 5B, 5C, 5D, 5E, 5F:
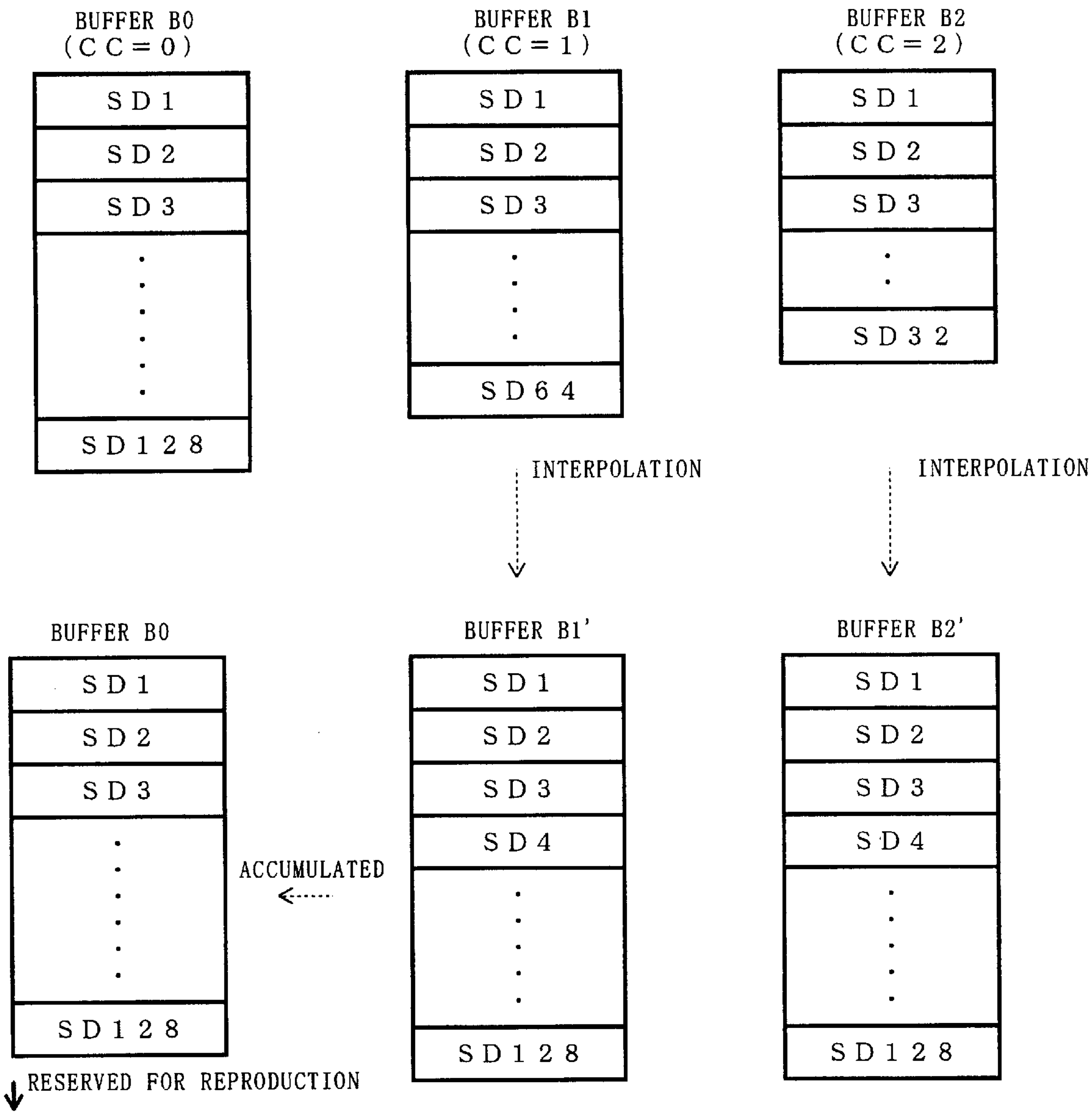
FIGS. 5A to 5F are diagrams illustrating structures and operations of various output buffer areas provided in the RAM of FIG. 1.

FIG. 5 illustrates an output buffer area provided in the RAM 3. Because, in the tone generating method of the present invention, the number of tone waveform samples to be collectively arithmetically formed upon arrival of each calculating time is caused to change by a variation of the waveform sample forming resolution CC (whose concept has already been discussed at the outset of this specification), there are provided a plurality of output buffers in corresponding relations to a plurality of waveform sample forming resolutions CC. Namely, in the preferred embodiment of the present invention, as shown in FIGS. 5A to 5C, three different waveform sample forming resolutions are employed and there are provided three output buffers: output buffer B0 for a basic waveform sample forming resolution (CC=0: equivalent sampling frequency of 48 kHz); output buffer B1 for ½ of the basic waveform sample forming resolution (CC=1: equivalent sampling frequency of 24 kHz); and output buffer B2 for ¼ of the basic waveform sample forming resolution (CC=2: equivalent sampling frequency of 12 kHz). Accordingly, output buffer B1 has a capacity to store ½ of the samples to be stored in buffer B0, and output buffer B2 has a capacity to store ¼ of the samples to be stored in output buffer B0.

The waveform sample forming resolution CC is designated both for each of the tone generating channels and for each tone waveform being sounded, and the waveform sample forming resolution CC specifies the number of tone waveform samples to be arithmetically formed in the corresponding channel. Thus, the waveform sample forming resolution CC can be expressed in an equivalent sampling frequency corresponding to the number of tone waveform samples to be formed. One of the three waveform sample forming resolution CC is selected depending on a frequency band covered by tone waveform samples to be formed.

Output buffer B0 shown in FIG. 5A is used where tone waveform samples to be formed are of a wide frequency band, and it stores 128 tone waveform samples (SD, SD2, SD3, . . . SD128) formed at each predetermined calculating time point. Output buffer B1 shown in FIG. 5B is used where tone waveform samples to be formed are of a less wide frequency band, and it stores 64 tone waveform samples (SD1, SD2, SD3, . . . SD64) formed at each predetermined calculating time point. Output buffer B2 shown in FIG. 5C is used where tone waveform samples to be formed are of a narrow frequency band, and it stores 42 tone waveform samples (SD1, SD2, SD3, . . . SD32) formed at each predetermined calculating time point.

In each of these buffers B0 to B2, there are additively stored tone waveform samples of various channels having been formed with a same waveform sample forming resolution CC (i.e., in such a manner to cover substantially the same frequency band), rather than on a channel-by-channel basis. That is, each newly formed tone waveform sample is added to already stored tone waveform samples in one of the output buffers and then stored into a same location of the buffer.

Once formation of tone waveform samples has been completed for all the tone generating channels, these waveform samples are accumulated and passed to the reproduction section 9 for audible reproduction. However, because different numbers of tone waveform samples are stored in buffer B0, buffer B1 and buffer B2, the samples can not be accumulated in a simple manner.

That is, an interpolation is effected between every adjacent ones of the 64 tone waveform samples stored in buffer B1 so as to provide 128 tone waveform samples that are then stored in buffer B1' shown in FIG. 5D, and similarly an interpolation is effected between every adjacent ones of the 32 tone waveform samples stored in buffer B2 so as to provide 128 tone waveform samples to be stored in buffer B2' shown in FIG. 5E. In this case, every other tone waveform sample in buffer B1' will have the same value as one of the 64 tone waveform samples at a corresponding location in buffer B1, and every fourth tone waveform sample in buffer B2' will have the same value as one of the 32 tone waveform samples at a corresponding location in buffer B2.

Then, the tone waveform samples at each corresponding location of buffers B0, B1' and B2' now containing 128 samples are accumulated and stored into, for example, the corresponding location of the buffer B0. After that, the accumulated waveform samples in the buffer B0 are reserved for reproduction so that the samples are later read out by the reproduction section 9 for audible reduction via the sound system. The tone waveform samples of all the channels need not necessarily be stored in the buffer B0, and may be stored in any other output buffer having a storage area for 128 samples.

Figure 8:
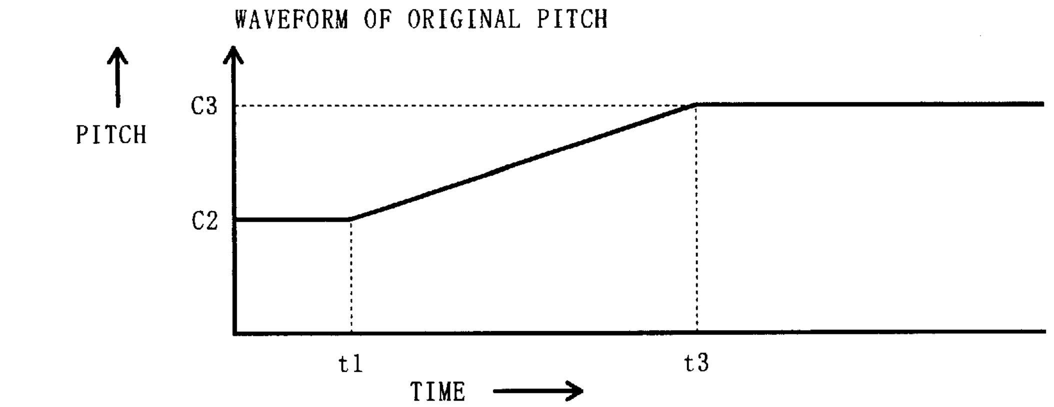
FIG. 8 illustrates an example of time-variation of an original pitch in a start-to-end waveform of a tone.
Figure 9:
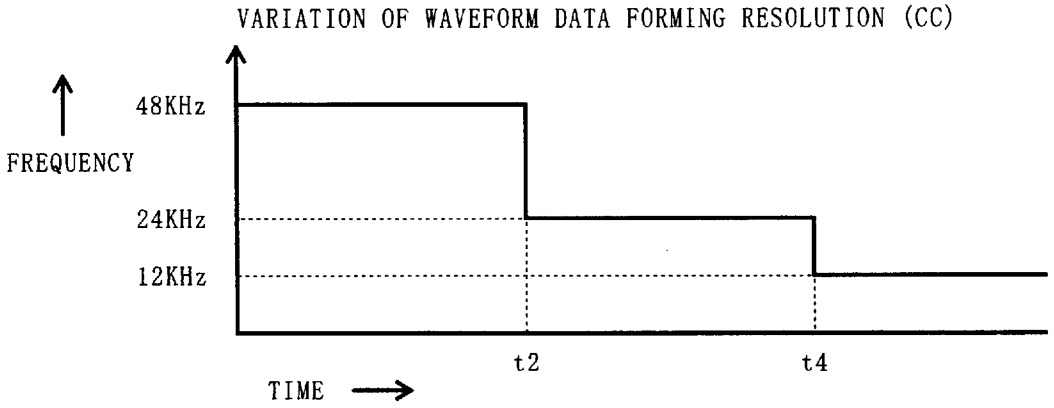
FIG. 9 illustrates an exemplary variation of a waveform sample forming resolution in relation to time during arithmetical formation of a ton.
Figure 10:
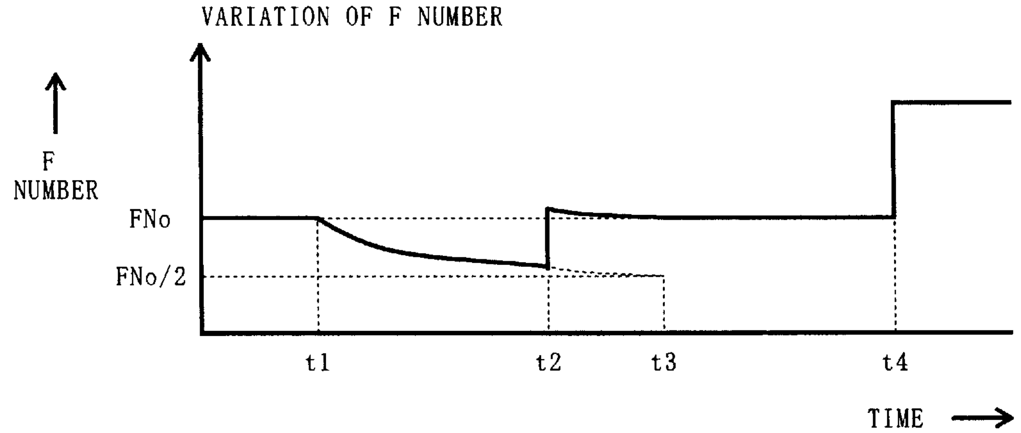
FIG. 10 illustrates an exemplary manner in which a reproducing frequency number is varied over time during arithmetical formation of a tone.
Figure 11:
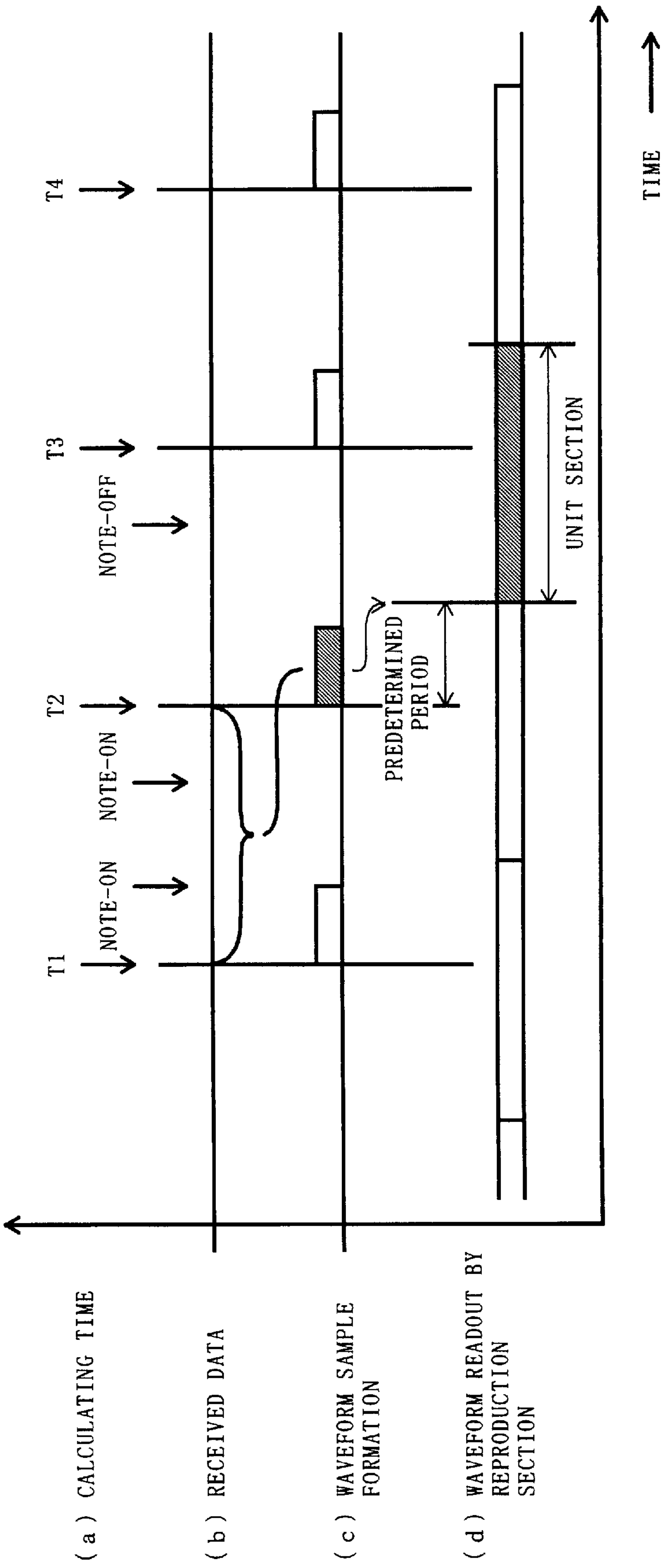
FIG. 11 is a timing chart explanatory of tone generator processing performed, by a CPU of FIG. 1, to form a tone waveform.

With reference to FIGS. 6 to 11, the tone generating method of the present invention will be outlined which is implemented in the tone generating device of FIG. 1 by use of the output buffers as mentioned earlier. In this preferred embodiment, the tone generating device 19 employs a tone generator based on the known waveform memory method (waveform-memory-based tone generator). FIG. 6 illustrates an example of waveform data from the start to end of a tone which are stored in the buffer (i.e., a set of waveform data to be used for complete (start-to-end) sounding of a tone); FIGS. 7A to 7D illustrate frequency spectra extracted at various time points of the waveform data of FIG. 6; FIG. 8 illustrates an exemplary time-variation of pitch in a waveform from the start-to-end of a tone when the arithmetically formed tone waveform samples are reproduced at a fixed reproducing rate; FIG. 9 illustrates an exemplary variation of waveform sample forming resolution CC in relation to the sample calculating time; FIG. 10 illustrates an exemplary manner in which F number is varied over time for arithmetically forming waveform samples of a tone; and FIG. 11 is a timing chart explanatory of tone generator processing to form a tone waveform.

According to the tone generating method of the present invention, as shown in item (a) of FIG. 11, tone waveform samples are arithmetically formed for a predetermined unit section to be read out from the reproduction section 9 whenever the calculating time points T1, T2, T3, T4 . . . arrives. New note-on and/or note-off event are received between the calculating time points as shown in item (b) of FIG. 11, and a plurality of tone waveform samples corresponding to these events are arithmetically formed collectively at timing as shown in item (c) of FIG. 11.

Thus, the arithmetically formed tone waveform samples of all the tone generating channels stored in the output buffer B0 are read out by the reproduction section 9 as waveform samples for the unit section so that they are reproduced at a constant reproducing rate (i.e., at a fixed reproducing sampling frequency).

As described earlier in relation to the output buffers, when a plurality of tone waveform samples for a single unit section are to be arithmetically formed in the present invention, the waveform sample forming resolution CC in the system is changed to one corresponding to a frequency band of a tone waveform to be formed as will be described below.

Horizontally elongate band WS in FIG. 6 represents a group of multiple waveform data contained in a decay tone with the horizontal axis representing passage of time, and for a purpose of illustration, the waveform data at time points "a", "b", "c" and "d" are extracted and shown emphatically by oblique hatching in the figure. In FIGS. 7A to 7D, there are shown examples of spectral distribution of fundamental and harmonic waves contained in the waveform data at these time points "a", "b", "c" and "d". More specifically, the section at time point "a" is an attack portion whose exemplary waveform shape is shown in detail in FIG. 6 and which contains a lot of harmonic wave spectral components as shown in FIG. 7A. The section at time point "b" is where high-frequency harmonic wave spectral components have slightly attenuated as shown in item FIG. 7B.

The section at time point "c" is a sustain portion where attenuation has further progressed as seen from its exemplary waveform shape in FIG. 6. As shown in FIG. 7C, the waveform at time point "c" is a simple waveform, close to that of the fundamental wave, with high-frequency harmonic wave components even further attenuated. Finally, the section at time point "d" is where high-frequency harmonic spectral components have virtually completely attenuated to null, leaving only the fundamental wave.

Because the frequency band of waveform data of a generated tone varies over time, there arises the problem that arithmetic formation of waveform data is performed even for unnecessary frequency bands as long as there is employed such a fixed waveform sample forming resolution as enabling formation of waveform data of a widest possible frequency band of the tone.

To avoid this inconvenience, the tone generating method of the invention is characterized by varying the waveform sample forming resolution CC in response to passage of time during arithmetical formation of a tone as shown in FIG. 9. In the illustrated example, the waveform sample forming resolution CC is set initially to the basic value of 48 kHz till time point t2, then to 24 kHz, i.e., half the basic value, between time points t2 and t4, and then to 12 kHz, half the second value, after time point t4. Such a variation in the waveform sample forming resolution CC is made only once at the beginning of each unit section of FIG. 11, with no waveform sample forming resolution variation taking place at an intermediate point of the unit section.

By applying a different waveform sample forming resolution CC depending on the time-varying frequency band, the present invention effectively prevents waveform data formation from being performed for unnecessary frequency bands to thereby save wasteful calculations. Allocating the time for the saved calculations to another tone generating channel can enhance the quality of a tone generated in that channel and can also provide an increased number of the channels capable of simultaneously generating tones.

According to a modification of the present invention, the waveform sample forming resolution in each tone generating channel may be varied at an intermediate point in a unit section. In such a case, arithmetic formation of waveform data in the channel is changed in response to the varied waveform sample forming resolution CC and the output buffer for accumulating output data of the channel is changed at an intermediate point in the unit section.

Incidentally, because the waveform data WD1, WD2, . . . WDn stored in the RAM 3 shown in FIG. 2 vary in frequency band during formation of a corresponding tone as noted earlier, the present invention, in response to the frequency band variation, varies the recording sampling frequency at which waveform data is sampled for storage, to thereby reduce the amount of waveform data to be stored. In this connection, it is customary in the art that the sampling frequency is made high for the attack section and gradually lowered in accordance with attenuation of the waveform data. If the waveform data stored with the sampling frequency varied consecutively during formation of a corresponding tone in the above-mentioned manner are read out from the RAM 3 at a fixed rate, the waveform data will cause a variation in pitch in accordance with the sampling frequency.

In the respective one-period waveforms at time points "a" and "c" in FIG. 6, the waveform width (along the horizontal axis) at time point "c" is decreased to one half of that at time point "a" due to the above-noted sampling frequency variation in the generated tone. Namely, although the waveform at time points "a" and "c" were originally of the same pitch, the length of an address region in the waveform memory where the one-period waveform at time "c" is stored is decreased to about a half of that for time point "a" because the sampling frequency in recording the waveform at time point "c" was about a half of that at time point "a".

An exemplary waveform (OPEG) in FIG. 8 shows a variation of original pitch (OP), during formation of a tone, when the waveform data are read out by use of the basic waveform sample forming resolution (48 kHz in the example of FIG. 9). In the illustrated example of FIG. 8, the original pitch OP of note number C2 linearly changes, from time point t1 to time point t3, to the pitch of note number C3 which is one octave higher than that of C2; the vertical axis represents a cent scale. Thus, when such waveform data are read out to form tone samples, it is necessary to control the readout rate (F number, i.e., a rate at which the read address advances in the waveform memory per sample of a tone to be formed) in such a manner that no pitch variation occurs during generation of the tone. "OP" stands for an original pitch, and "OPEG" stands for an original pitch envelope.

Here, the sampling frequency at which waveform data is sampled to be stored into the waveform memory presents an exactly opposite variation (along the cent scale) to that of the above-mentioned OPEG waveform, and OPEG control data for controlling the shape of the OPEG waveform is generated on the basis of the data that controlled the sampling frequency variation during recording.

In order to generate a tone of a designated pitch, it suffices to, on the basis of the designated pitch and OPEG waveform) generate an F number as a pitch variation amount for shifting the original pitch (indicated by the values of the OPEG waveform). Specifically, a difference between the designated sounding pitch and original pitch is calculated in cents. Then, the calculated difference is converted from the cent representation into Hz representation so as to determine an F number. In this case, once the OPEG varies, the F number varies with the OPEG variation, even when there is no variation in the designated sounding pitch.

A predetermined number of waveform samples specified by the waveform sample forming resolution CC are arithmetically formed, at each calculating time, as samples for a single unit section. However, when the waveform sample forming resolution CC varies during formation of a tone as shown in FIG. 9, it is necessary to simultaneously change the readout rate (F number) at which the waveform data are read out per sample to be formed. If, for example, the basic waveform sample forming resolution (CC=0) of 48 kHz is halved to 24 kHz (CC=1), the waveform readout rate per sample has to be increased twice as high as the original, and if it is lowered to 12 kHz (CC=2), the waveform readout rate per sample has to be increased four times as high as the original.

For this reason, the present invention is constructed to change, simultaneously with the variation of the waveform sample forming resolution, the F number, i.e., an amount of per-sample increment of an address counter for reading out waveform data that is designated at the time of the arithmetic formation. The waveform sample forming resolution is set for each of the tone generating channels so as to minimize the amount of wasteful waveform calculations for the channel.

The present invention implements both waveform compression by variation in the waveform data sampling frequency (variation in the OPEG waveform shown in FIG. 8) and saving of the waveform calculations by variation in the waveform sample forming resolution CC (variation in the waveform sample forming resolution CC shown in FIG. 9), and as a result, the F number varies during generation of a tone in a manner shown in FIG. 10. As shown in FIG. 10, the F number having an initial value FNO is decreased in an arcuate curve from time point t1 to time point t2 in response to the OPEG waveform variation. The F number is doubled at time point t2 in response to the waveform sample forming resolution CC having been halved to 24 kHz, and then again decreased in an arcuate curve from time point t2 to time point t3 in response to the OPEG waveform variation. The F number is maintained at value FNO from time point t3 to time point t4 (i.e., the original F number is restored by the doubled OPEG waveform and the halved waveform sample forming resolution CC offsetting each other) and then further doubled at time point t4 in response to the waveform sample forming resolution CC having been lowered to ¼ of the original. After time point t4, the F number is maintained at value 2 FNO.

An equation to calculate the F number is:

$$\text{F number}=2^{(SP-OP)}/1200*2^{cc} \qquad \text{Equation (1)}$$

, where SP represents a pitch of a note number to be sounded, OP an original pitch, and CC a ratio relative to the basic waveform sample forming resolution (48 kHz). When the basic waveform sample forming resolution is applied, CC=0; when the waveform sample forming resolution is halved, CC=1; and when the waveform sample forming resolution is lowered to ¼, CC=2.

Figure 12:
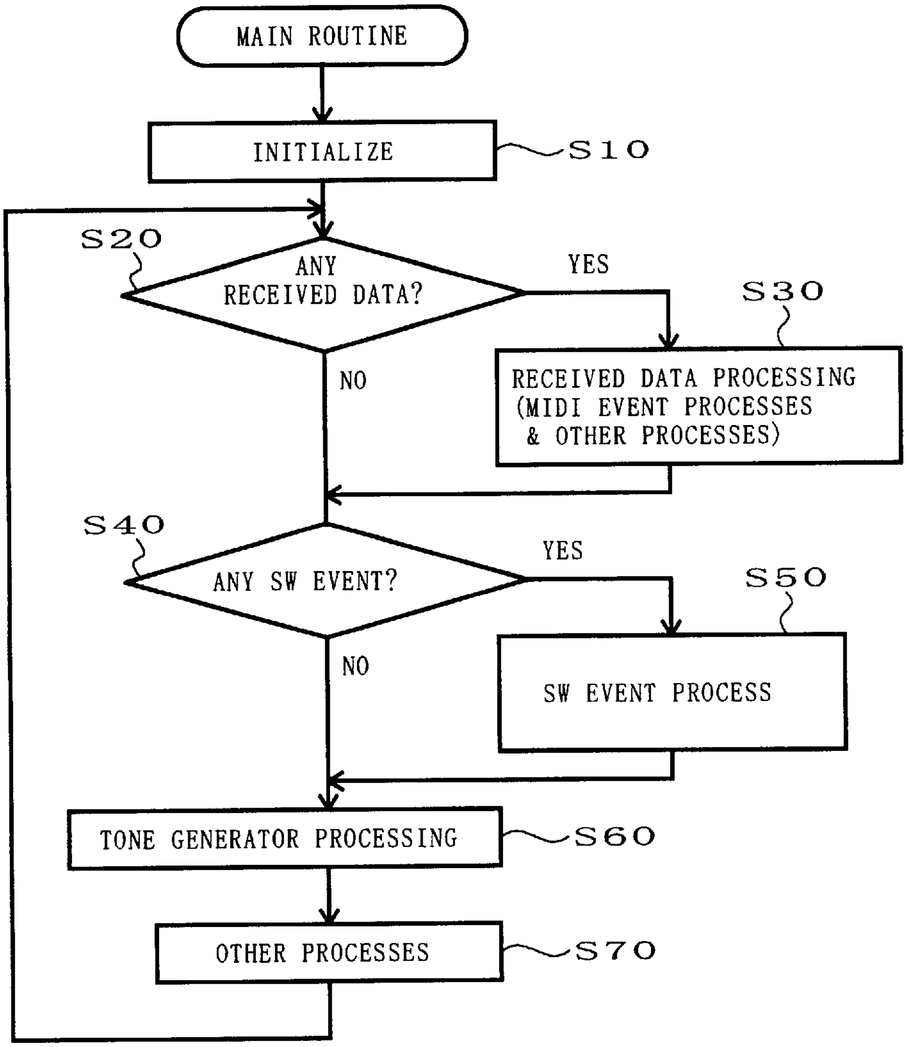
FIG. 12 is a flowchart of a main routine performed, by the CPU of FIG. 1, in a software tone generator implementing the tone generating method of the present invention.

FIG. 12 is a flowchart of a main routine performed, by the CPU 1 of FIG. 1, in a software tone generator implementing the tone generating method of the present invention. Upon a start of the main routine, initialization is performed at step S10, where all the tone generating channels are cleared and initial preparations are made of tone color data, waveform data, etc.

At next step S20, a determination is made as to whether there is any received data, by ascertaining whether any MIDI received data has been recorded in the above-mentioned input buffer of FIG. 3. If there is no received data recorded in the input buffer, the CPU moves to step S40, but if there is any received data recorded in the input buffer, the CPU branches to step S30, where received data processing is executed for operations corresponding to the received MIDI event (note-on process, note-off process and the like) and other necessary operations.

It is checked at step S40 whether any switch has been activated. If answered in the negative at step S40, the CPU 1 goes to step S60; if any switch has been activated, it is determined that there is a switch event, so that switch event process is executed at step S50 to set a tone color of one of plural performance parts as dictated by the activated switch.

Then, tone generator processing is executed at step S60 to arithmetically form tone waveform samples collectively upon arrival of each calculating time. After performing other necessary processes at step S70, the CPU 1 loops back to step S20 to repeat the operations of steps S20 to S70 (regular loop). If the reproduction section 9 comprises a dedicated tone generator based on selectable algorithms or a DSP tone generator, the tone generator processing at step S60 may be omitted.

Figure 13:
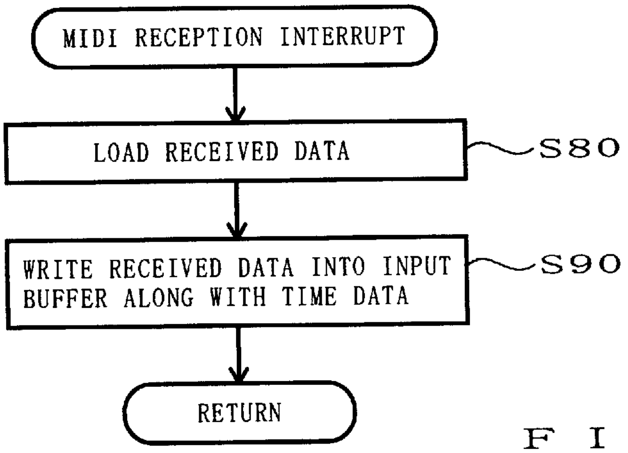
FIG. 13 is a flowchart of a MIDI reception interrupt process carried out by the CPU.

FIG. 13 is a flowchart of a MIDI reception interrupt process carried out by the CPU 1. This MIDI reception interrupt process is activated when the MIDI interface 5 receives a MIDI event from the outside, with priority over other processes. Upon a start of the MIDI reception interrupt process, the received data is loaded at step S80, and at step S90 it is written into the input buffer along with its time data (indicative of the time of reception of the received data) in a format as shown in FIG. 3. After step S90, the CPU 1 returns to the process that was being executed Just before the interrupt process. With these operations, MIDI data will be sequentially written into the input buffer along with the corresponding reception time data.

Figure 14:
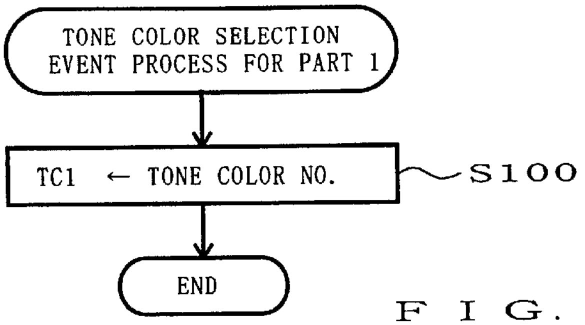
FIG. 14 is a flowchart of a tone color selection event process for part 1 that is executed as an example of panel switch event processing in the main routine.

Further, FIG. 14 is a flowchart of a tone color selection event process for part 1 that is executed as an example of the switch event processing at step S50 of the main routine, where for each of the performance parts, a tone color number selected by activation of a predetermined switch is stored as TC1 at step S100. After the operation of step S100 is completed for all the performance parts, the tone color setting process comes to an end.

Figure 15A:
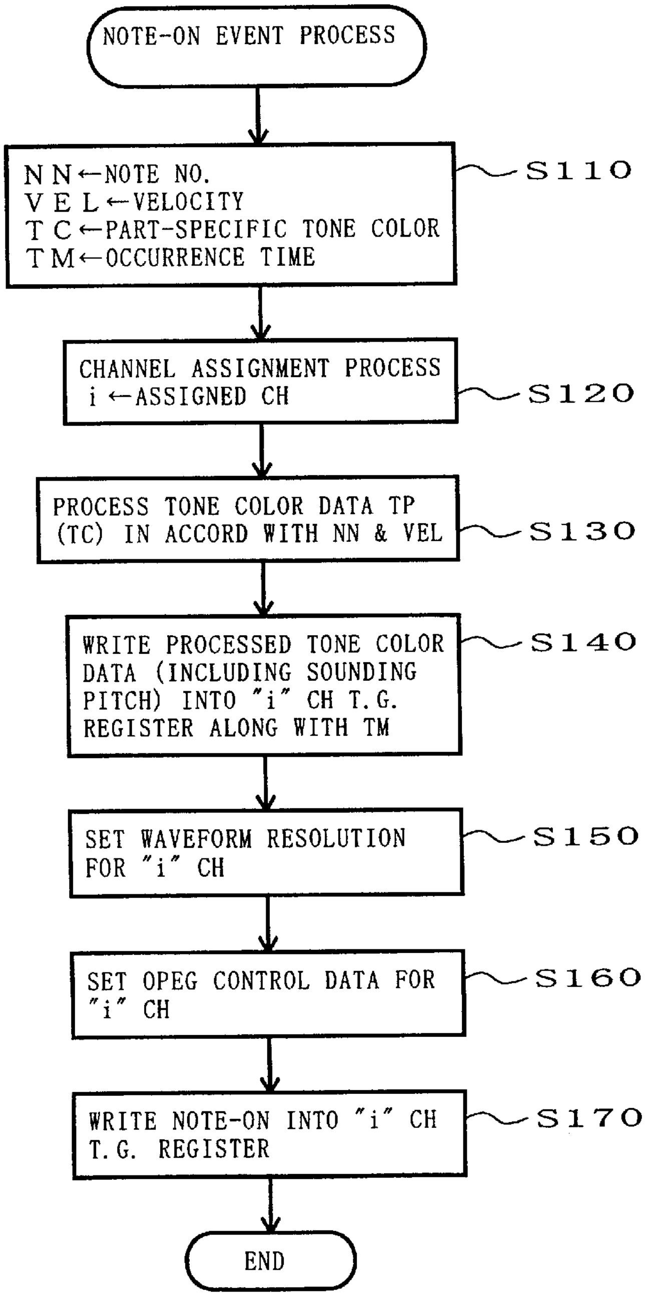
FIG. 15A is a flowchart illustrating an exemplary detail of a note-on process that is performed in received data processing during the main routine.
Figure 15B:
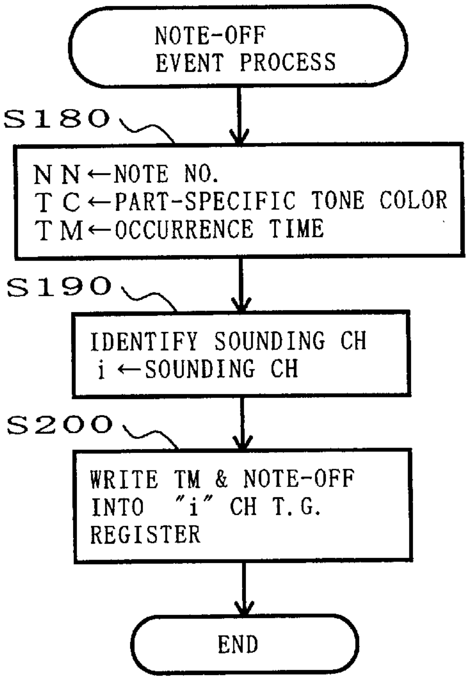
FIG. 15B is a flowchart illustrating an exemplary detail of a note-off process that is performed in received data processing during the main routine.

In FIGS. 15A and 15B, there are shown details of the note-on process and note-off process, respectively, that are performed in the received data processing at step S30 of the main routine.

When the received data is note-on event data, the note-on process is executed as shown in FIG. 15A, where at step S110, the note number, velocity and part-specific tone color of the note-on event data stored in the input buffer are loaded into corresponding registers as NN, VEL and TC, respectively, and the occurrence time of the note-on event is also loaded into a corresponding register as TM. At next step S120, a channel assignment process is performed to assign the loaded note number NN to one of channels and the number "i" of the assigned channel is stored into a register.

Then, at step S130, tone color data TP(TC) of the tone color TC now set for the individual performance part is processed in accordance with the note number NN and velocity VEL. Here, the tone color data is one selected from among tone color data PD1 to PD16 shown in FIG. 2. At next step S140, the processed tone color data including a pitch SP to be sounded is written into the tone generator register of channel number "i" of FIG. 4 along with the occurrence time TM of the note-on event. Also, waveform designating data D to be written into the tone generator register is determined by using the note number NN to refer to the pitch range waveform designating data of the tone color data shown in FIG. 2, and any one of the waveform data WD1 to WDn is designated as a waveform to be used for forming a tone corresponding to the note number NN.

Then, at step S150, timing to vary the waveform sample forming resolution of the "i" channel and forming resolution control data designating a waveform sample forming resolution value are set into the "i" channel tone generator register. The setting of such forming resolution control data is effected on the basis of forming resolution control data contained in the tone color data selected for the "i" channel. Because the timing to vary the waveform sample forming resolution is specified once for each unit section where calculations take place per calculating time, the waveform sample forming resolution variation can be achieved by detecting the number of arrivals of the calculating time. Then, at step S160, OPEG control data read out from a waveform data area is set into the "i" channel tone generator register. The OPEG control data is data for controlling the shape of the OPEG waveform that represents a manner in which the original pitch varies during generation of a tone as shown in FIG. 8.

Note-on data is written into the tone generator register of the "i" channel at next step S170, and then the note-on event process comes to an end.

When the received data is note-off event data, the note-off process is executed as shown in FIG. 15B, where at step S180, the note number, velocity and part-specific tone color of the note-off event data stored in the input buffer are loaded into corresponding registers as NN, VEL and TC, respectively, and the occurrence time of the note-off event is also loaded into a corresponding register as TM. Then, at step S190, one of the tone generating channels is identified which is generating a tone of the tone color TC and note number NN, and the identified channel number "i" is stored into a register.

The occurrence time TM and note-off data are written into the "i" channel tone generator register at step S200, and then the note-off process comes to an end.

Figure 16:
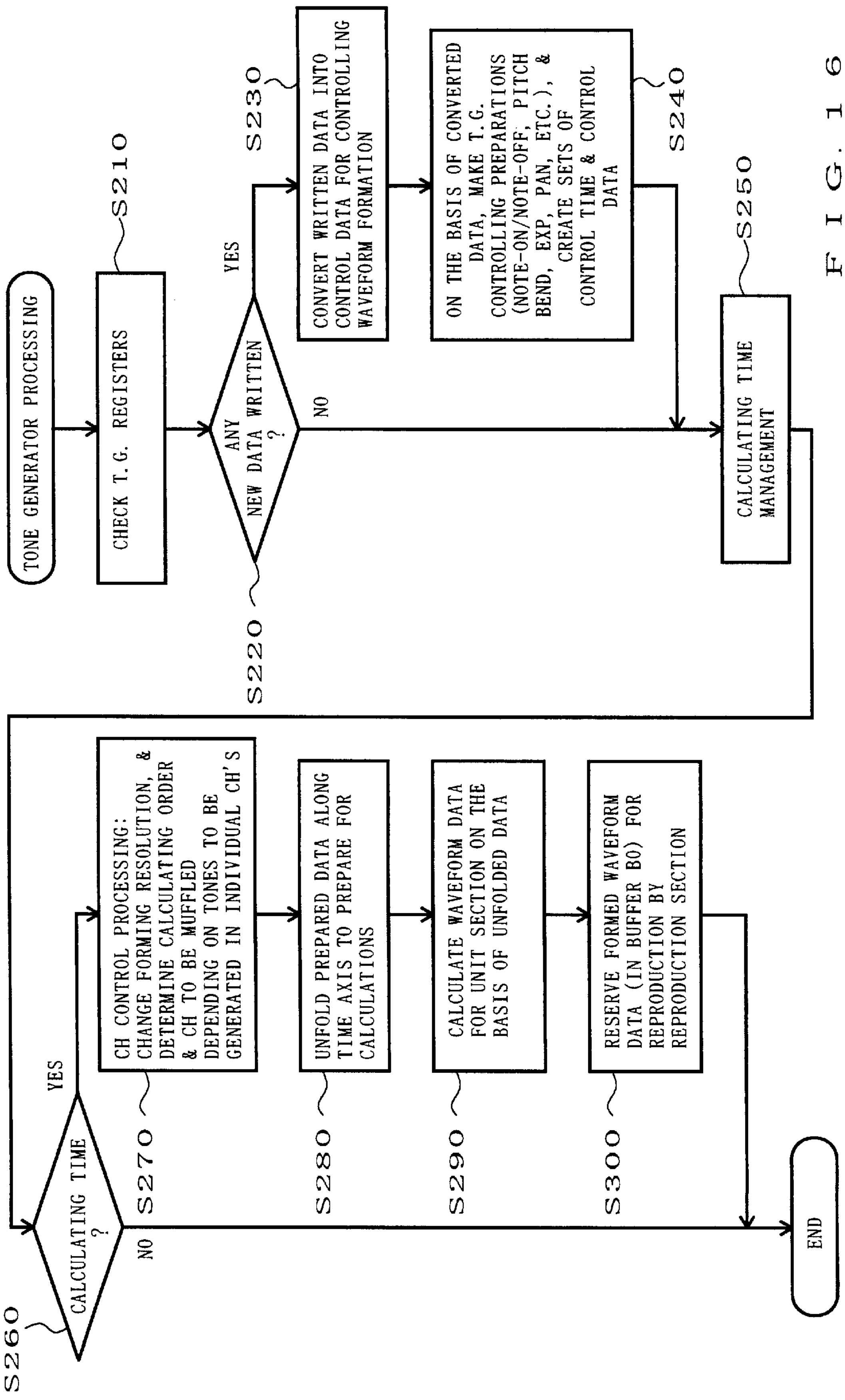
FIG. 16, a flowchart illustrating a detail of the tone generator processing executed in the main routine.

Now, with reference to FIG. 16, a fuller description is made about the tone generator processing that is executed at step S60 in the regular loop of the main routine.

First, at step S210, the tone generator registers are checked to see whether any new data has been written therein. The CPU 1 proceeds directly to step S250 if no new data has been written; if some new data has been written, the CPU 1 branches to step S230, where the written data is converted into control data for controlling waveform formation.

Then, predetermined preparations for calculations are made on the basis of the converted control data at step S240, such as tone generator controlling preparations, e.g., of note-on/note-off, pitch bend, EXP, pan and other data and creation of sets of control time and control data. That is, each time new data is written, the predetermined preparations are made at steps S230 and S240 for subsequent tone forming calculations at steps S270 to S290.

At next step S250, in such a manner that readout of waveform data is not broken off in the reproduction section 9, a calculating time management process is performed to designate a predetermined time point before current reproduction of waveform data comes to an end. More specifically, in arithmetically forming a plurality of tone waveform samples corresponding to a single unit section as shown in item (c) of FIG. 11 at each calculating time as shown in item (a), the calculating time management process is performed to set the calculating time point in consideration of the time required for the arithmetic formation, so as to prevent an undesirable break in the waveform samples read out by the reproduction section 9.

Then, at step S260, a determination is made as to whether a calculating time point set via the above-mentioned calculating time management process has arrived. If answered in the negative at step S260, the CPU 1 terminates the tone generator processing without doing other processes. If no new data has been written in the tone generator register and the set calculating time point has not arrived, no particular operations are performed in the tone generator processing. Once the set calculating time point has arrived after stepping through the regular loop of the main routine several times, a process is executed, at and after step S270, to arithmetically form a plurality of tone waveform samples corresponding to a single unit section.

That is, at step S270, various channel control processing is performed in accordance with tones to be generated in the individual channels, such as a forming resolution varying process for designating a specific number of tone waveform samples to be formed per unit time; a calculating order determining process to determine a calculating order across the channels in such a manner that necessary calculations are performed from one of the channels sounding a most important tone to another channel sounding a least important tone; and a tone-deadening channel (channel to be muffled) determining process for determining the last channel in the calculating order as a channel where the currently sounding tone should be deadened or muffled.

A control data unfolding process is executed at next step S280, where the data prepared at the above-mentioned step S240 is unfolded along the time axis to make preparations for the calculations. After that, a waveform forming calculation process is executed, where reproductive waveform data (tone waveform samples) for a single unit section are calculated on the basis of the data unfolded at step S290. In addition, as described earlier in relation to FIG. 5, reproductive waveform data of different waveform sample forming resolutions are subjected to interpolation in such a manner to be identical in number to those formed with the basic waveform sample forming resolution, and then the reproductive waveform data of all the channels are accumulated to be stored, for example, into the buffer B0. Then, at step S300, a reproduction reservation is made, with respect to the buffer B0 storing the accumulated reproductive waveform data from all the channels, such that the reproduction section 9 later reads out the reproductive waveform data.

Figure 17:
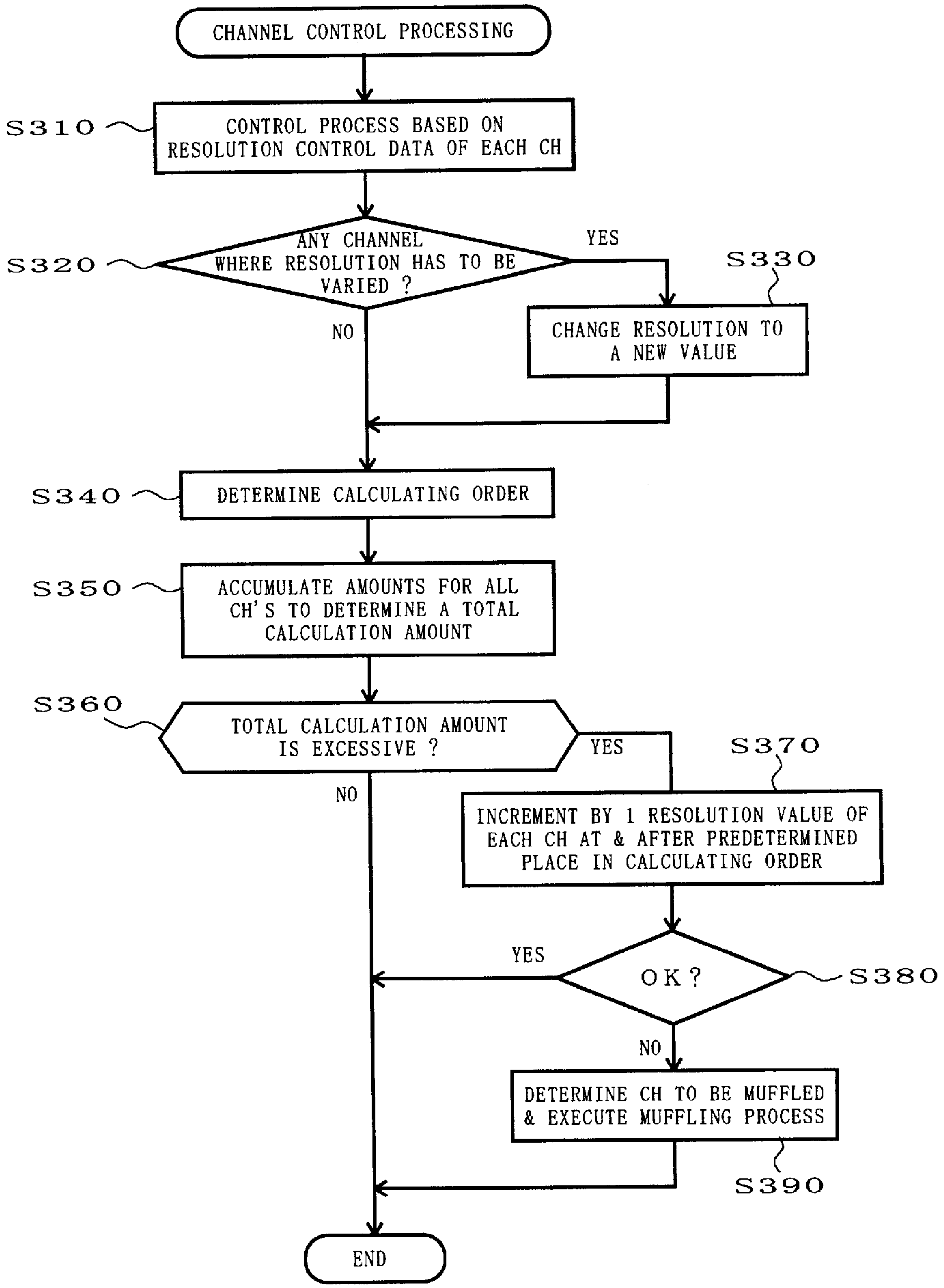
FIG. 17 is a flowchart illustrating a detail of channel control processing executed in the tone generator processing.

As described above, the present invention can vary the waveform sample forming resolution individually for each of the tone generating channels and during formation of a tone in the channel. FIG. 17 is a flowchart illustrating a detail of the channel control processing executed at step S270 of the tone generator processing.

In the channel control processing, the waveform sample forming resolution varying process is executed at step S310 to vary the waveform sample forming resolution during formation of a tone on the basis of forming resolution control data supplied to each of the channels. In this control process, passage of time is counted to control timing for varying the waveform sample forming resolution. If there is currently no need to vary the waveform sample forming resolution, the CPU 1 goes directly to step S340; however, if there is any channel where the waveform sample forming resolution has to be varied (i.e., when there has arrived the variation timing designated by the forming resolution control data of the channel), an affirmative determination results at step S320, so that the waveform sample forming resolution CC of the channel is changed to a new value (a value at the timing designated by the control data) at step S330.

At step S340, the calculating order determining process is executed to determine a calculating order across a plurality of the tone generating channels in such a manner that necessary calculations for those channels sounding important tones or tones that should not be deadened are performed with priority over the other channels. Here, such channels that are not currently sounding tones do not need calculations and hence do not have to be included in the calculating order. Then, amounts of the calculations for all the channels are accumulated at step S350 to determine a total calculation amount. In this case, the respective calculation amounts of the individual channels differ due to different waveform sample forming resolutions applied to the channels and also the tone generating method if different types of the tone generating method are employed in the channels. At next step S360, a determination is made as to whether the determined total calculation amount is excessive or exceeds a predetermined range. If the total calculation amount is within the predetermined range, the CPU 1 terminates the channel control processing without performing any other operations, so as to execute the waveform calculating process as will be described in detail later.

If it is determined at step S360 that the total calculation amount exceeds the predetermined range, this means that necessary calculations will not be completed before predetermined readout timing of the reproduction section 9 and there will be a break in the reproductive waveform data. For this reason, the waveform sample forming resolution CC of each channel after a predetermined place in the calculating order is lowered by "1" (the resolution value is incremented by 1) so as to reduce the number of samples to be actually formed; that is, the waveform sample forming resolution CC=0 is changed to the waveform sample forming resolution CC=1, and the waveform sample forming resolution CC=1 is changed to the waveform sample forming resolution CC=2.

After that, a determination is made at step S380 as to whether the total calculation amount is now within the predetermined range. If the total calculation amount is within the predetermined range as determined at step S380, the channel control processing comes to an end; if, however, the total calculation amount is still more than the predetermined range, one or more channels at or before the last place in the calculating order are determined as tone-deadening or muffling channels and then the currently sounding tones are deadened in the determined channels.

If the number of tones to be generated is excessive, it has been customary for the conventional tone generator control technique to perform a so-called "truncate" process to compulsorily deaden any of tones being generated. In contrast, the preferred embodiment of the invention attempts to avoid such a conventional tone deadening even when the total calculation amount is determined at step S360 to exceed the predetermined range, by first lowering the waveform sample forming resolution through the operations of steps S370 to S390. Because the waveform sample forming resolution lowering is applied only to one or more tones of lower importance, no adverse musical effects will result. However, only when it is determined that the excessive calculation amount can not be properly dealt with by the lowering of the forming resolution alone, the preferred embodiment resorts to the conventional tone deadening process.

Once the channel control processing is completed in the above-mentioned manner, the waveform calculating process is carried out as described hereinbelow.

Figure 18:
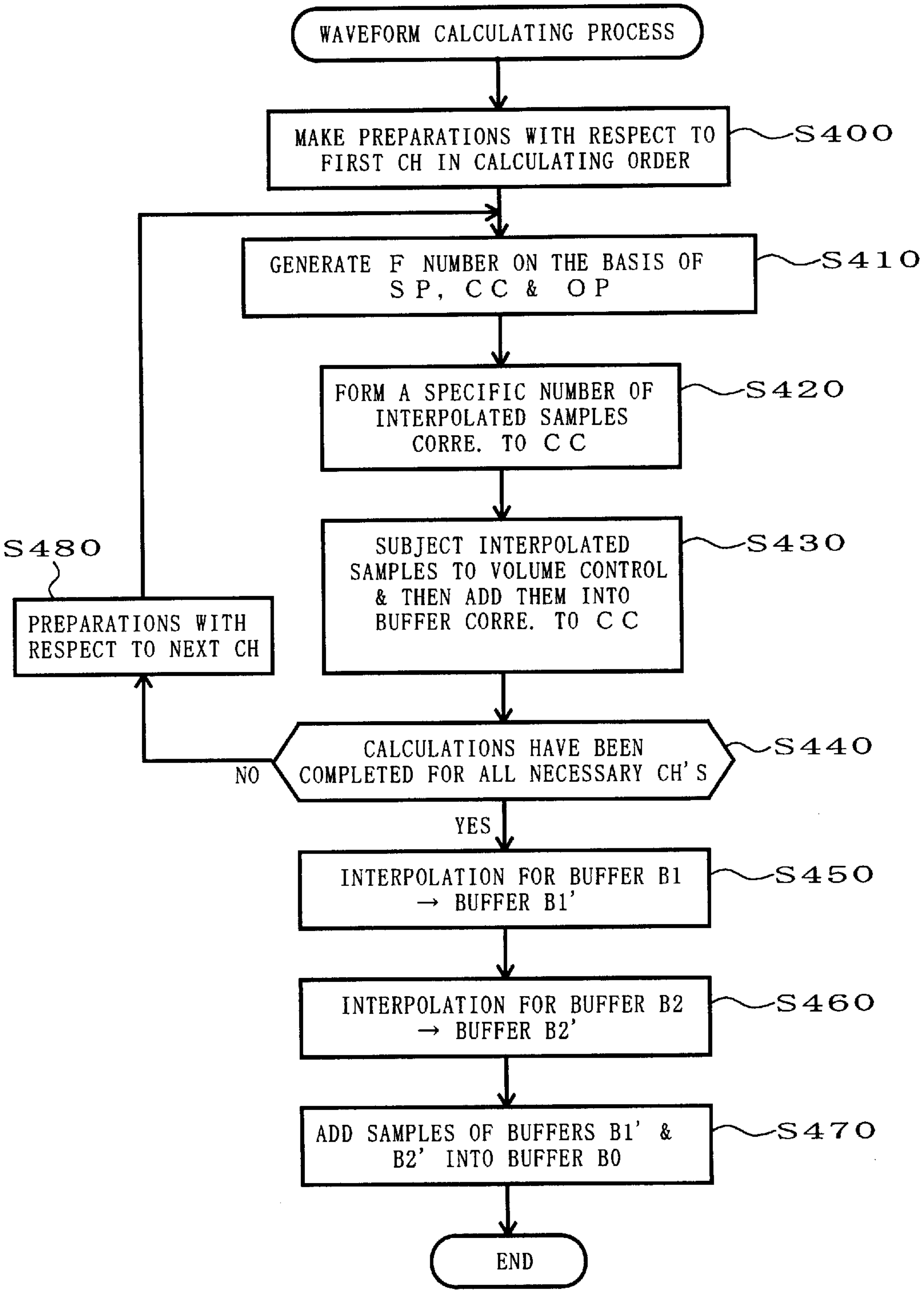
FIG. 18 is a flowchart illustrating a detail of a waveform calculating process.

FIG. 18 is a flowchart illustrating a detail of the waveform calculating process. First, at step S400, necessary preparations are made with respect to the tone generating channel placed first in the calculating order, and the output buffers of FIG. 5 are all cleared prior to the calculations. At next step S410, an F number is generated using the above-mentioned Equation (1) on the basis of a sounding pitch SP, waveform sample forming resolution CC and original pitch OP. Because of the arrangement that an F number is generated for each of the channels in each execution of step S410, the F number can vary immediately in response to a variation of the waveform sample forming resolution CC and original pitch OP during formations of a tone. The F number can also vary in response to a variation of the pitch SP, caused by impartment of a pitch bend, vibrato or other effect, during formation of a tone.

It is usually not necessary to vary the F number during tone waveform sample forming calculations for a single unit section, because the calculating time points normally occur at intervals of about several milliseconds.

Then, at step S420, a read address is generated, so that waveform data is read out in accordance with the integer portion of the generated read address and an interpolation is performed between two successively read-out waveform data in accordance with the decimal portion of the read address. At next step S420, the above-mentioned generation of per-sample read address and subsequent interpolation are repeated a predetermined number of times corresponding to the forming resolution CC, so as to form a predetermined number of interpolated samples corresponding to the forming resolution CC. The read address for each interpolated sample is obtained by adding the F number to the read address of the last interpolated sample. Thus, the read address increments, for each interpolated sample, at a rate corresponding to the F number, and the pitch of the read-out waveform is controlled in accordance with the incrementing rate of the address.

Then, at step S430, the interpolated sample generated at the preceding step is subjected to tone volume control based on a tone volume envelope waveform and then added into one of the buffers B0 to B2 which corresponds to the current waveform sample forming resolution CC. The tone volume envelope waveform, which is a waveform for controlling variation of the tone volume envelope from the attack to decay of a tone, is arithmetically formed in correspondence with individual interpolated samples on the basis of the AEG controlling data D stored in the tone generator register region for each channel. As described previously, both the number of interpolated samples to be formed and the number of samples to be stored in a selected one of the output buffers are controlled by the forming resolution CC to be the same. Thus, the operation of step S430 is performed on a sample-by-sample basis similarly to the above-mentioned step S420. That is, the tone volume control based on the tone volume envelope waveform and addition into the output buffer are performed on a sample-by-sample basis.

By executing the various processes in the above-mentioned sequence, it is possible to minimize the number of the CPU's write and read to and from calculating registers, to thereby increase the overall processing speed.

In this way, tone waveform samples calculated in the channels employing the basic waveform sample forming resolution are additively stored into the buffer B0, tone waveform samples calculated in the channels employing ½ of the basic waveform sample forming resolution are additively stored into the buffer B1, and tone waveform samples calculated in the channels employing ¼ of the basic waveform sample forming resolution are additively stored into the buffer B2.

Then, at step S440, a determination is made as to whether the calculations have been completed for all the tone generating channels requiring such calculations. If there is still any tone generating channel left requiring the calculations (i.e., still sounding a tone), the determination at step S440 becomes negative, so that the CPU 1 branches to step S480 to make the above-mentioned preparations for the next tone generating channel and thereafter reverts to step S410. Thus, the operations of steps S410 to S480 are repeated until the calculations are completed for all the tone generating channels.

When the CPU 1 are running another software program in parallel with the program of the invention, the necessary calculations may be delayed because too much time is spent on processing of the software. In such a case, in order to avoid an undesirable break in the reproduction by the reproduction section 9, it may be determined at step S440 that the calculations have been completed for all the tone generating channels even though there is still any tone generating channel left requiring the calculations.

As a result of the above-mentioned operations, interpolated samples of a plurality of the tone generating channels calculated according to the waveform sample forming resolution CC are accumulatively stored into the buffers B0, B1 and B2 shown in FIG. 5.

Once the calculations have been completed for all the tone generating channels requiring such calculations, interpolation operations are performed at step S450 on the waveform samples stored in the buffer B1 (twofold oversampling) so that the interpolated samples are caused to be identical in number to those calculated with the basic waveform sample forming resolution and then stored into the buffer B1' having the same construction as the buffer B0 (see FIG. 5D). Then, interpolation operations are performed at step S460 on the waveform samples stored in the buffer B2 (fourfold oversampling) so that the interpolated samples are caused to be identical in number to those calculated with the basic waveform sample forming resolution and then stored into the buffer B2' having the same construction as the buffer B0 (see FIG. 5E).

Subsequently, by adding the waveform samples of the buffers B1' and B2' into the buffer B0, the waveform samples of all the channels are stored into the buffer B0 (see FIG. 5F). This terminates the waveform calculating process, and the stored waveform samples in the buffer B0 will then be reserved to be read out by the reproduction section 9 for audible reproduction.

The tone generating method of the present invention has been described above as a program executed by the tone generating device of FIG. 1, but it may be executed as a single application program on a general-purpose computer operated by various operating systems such as "Windows" (operating system for personal computers commercially available from Microsoft Corporation, U.S.A.).

Although a detailed description has not been made above about the calculation process for collectively forming a plurality of waveform samples per predetermined unit time, the calculation process may be other than mere waveform memory readout operations as in the foregoing embodiment, such as the known FM synthesizing operations, AM synthesizing operations or Fourier synthesizing operations.

With the above-described arrangements, the present invention can determine a waveform sample forming resolution, for each tone generating channel, depending on whether or not a tone waveform to be sounded is of a wide frequency band, or on importance of the tone. The present invention can also arithmetically form tone waveform samples irrespective of whether a tone waveform to be sounded is of a wide frequency band or narrow frequency band, without performing wasteful calculations.

Further, because the waveform sample forming resolution is raised for the attack portion of a decay tone in order to form a greater number of waveform samples and is lowered for the sustain portion to form a smaller number of waveform samples, wasteful calculations can be avoided so that waveform samples from the start to end of a tone can be formed efficiently without involving wasteful calculations.

By thus saving waveform calculations for a specific tone generating channel, it is possible to increase the amount of waveform calculations for another tone generating channel to thereby enhance the quality of a tone generated in that channel, and the number of channels capable of simultaneously generating tones can be increased.

Moreover, because the invention can control the number of tone waveform samples to be formed per unit time independently for each channel, tones can be generated with different qualities among the channels. Also, it is allowed to reduce the amount of calculations for a specific channel which will present no significant effect even though the tone generated therein is of low quality.

Next, with reference to FIGS. 6, 7A to 7D and 19 to 25, a description will be made about a waveform data compressing method according to another aspect of the present invention.

Figure 19:
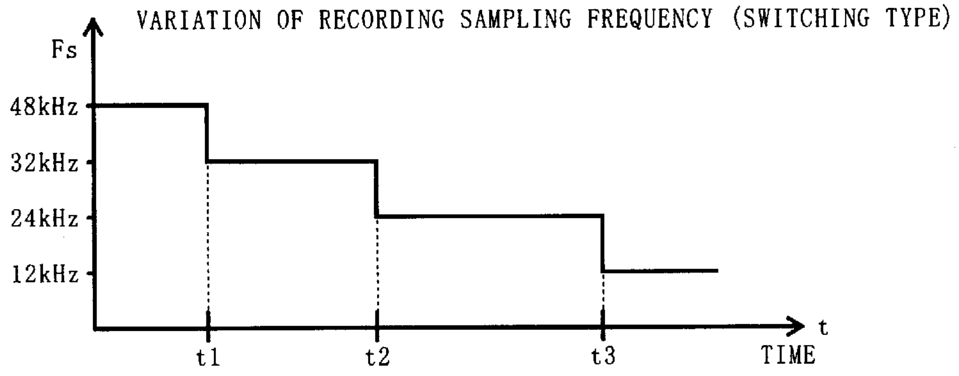
FIG. 19 is a diagram illustrating an exemplary manner in which a recording sampling frequency is varied, in accordance with a waveform data compressing method of the present invention, when time-serial waveform data covering from the start to end of a single tone are recorded.

As mentioned earlier, FIG. 6 diagrammatically shows a set of waveform data stored in a buffer to be used for complete (start-to-end) sounding of a single tone, FIGS. 7A to 7D illustrate frequency spectra of the waveform data of FIG. 6 as extracted at various points "a", "b", "c" and "d", and FIG. 19 illustrates an exemplary manner in which sampling frequency Fs is varied when time-serial waveform data for complete sounding of a single tone are sampled and stored.

First, with reference to FIGS. 6, 7A to 7D and 19, a description will be made about how the sampling frequency Fs is set.

As shown in FIG. 7A, the waveform data of the attack portion at point "a" of FIG. 6, which has a relatively wide frequency band, present a frequency spectral distribution with numerous harmonic components existing up to high frequency F1. The sampling frequency Fs in sampling the attack-portion waveform data of having the spectral distribution shown in FIG. 7A has to be at least higher than frequency 2f1.

The slightly attenuated waveform data at point "b" of FIG. 6 present a frequency spectral distribution with components existing up to frequency f2, as shown in FIG. 7B. That is, the higher-order harmonic components have attenuated faster, leaving the frequency band narrower than that of the attack portion. The sampling frequency Fs in sampling the waveform data of having the spectral distribution shown in FIG. 7B has to be at least higher than frequency 2f2.

Further, the waveform data of a sustain portion at point "c", where the harmonic components have further attenuated, present a frequency spectral distribution with components existing only up to frequency f3 and has a considerably narrowed frequency band, as shown in FIG. 7C. The sampling frequency Fs in sampling the waveform data of having the spectral distribution shown in FIG. 7C has to be at least higher than 2f3; this means that the sampling frequency Fs can be substantially lower than the above-mentioned sampling frequency 2f1 for the attack portion.

Also, as shown in FIG. 7D, the further attenuated waveform data at point "d" of FIG. 6, which only contain low-order harmonics, present a frequency spectral distribution with components existing only up to frequency f4 close to the fundamental wave, leaving the frequency band far narrower than that of the attack portion. The sampling frequency Fs in sampling the waveform data of having the spectral distribution shown in FIG. 7D has to be at least higher than 2f4; this means that the sampling frequency Fs can be very low, e.g., several times lower than the above-mentioned sampling frequency 2f1 for the attack portion.

As mentioned, the sampling frequency necessary for the waveform data corresponding to complete (start-to-end) sounding of a single tone can be made lower as attenuation of the waveform data progresses. Thus, the present invention is constructed to compress waveform data to be recorded, by varying the sampling frequency Fs in recording the waveform in the above-mentioned manner.

In the illustrated example of FIG. 19, the sampling frequency Fs is set to an initial highest frequency of 48 kHz for a period up to time point t1 including at least a time when the attack portion ends, switched at time point t1 to a lower frequency of 32 kHz, and then again switched at time point t2 to 24 kHz that is half the frequency for the attack portion. Here, the per-unit-time waveform sample data amount from time point t1 to time point t2 is $\frac{2}{3}$ of the initial per-unit-time waveform sample data amount prior to time point t1, the per-unit-time waveform sample data amount from time point t2 to time point t3 is $\frac{1}{2}$ of the initial per-unit-time waveform sample data amount prior to time point t1, and the per-unit-time waveform sample data amount from time point t3 is $\frac{1}{4}$ of the initial per-unit-time waveform sample data amount prior to time point t1. Thus, the amount of waveform samples for complete sounding of a single tone can be significantly reduced as a whole, and the waveform sample amount reduction will have greater effects when a multiplicity of waveform data are sampled to be stored.

The thus-reduced waveform sample data for complete sounding of the tone are directly written into the waveform memory, so that they will then be read out from the memory for audible reproduction at a fixed reproducing rate. The fixed reproducing rate is the converting timing of the D/A converter. However, if the waveform sample data for complete sounding of the tone are recorded while varying the sampling frequency Fs as shown in FIG. 19 and then reproduced at a fixed reproducing rate, the resultant reproduced waveform sample data will naturally vary in pitch during generation of the tone.

Figure 20:
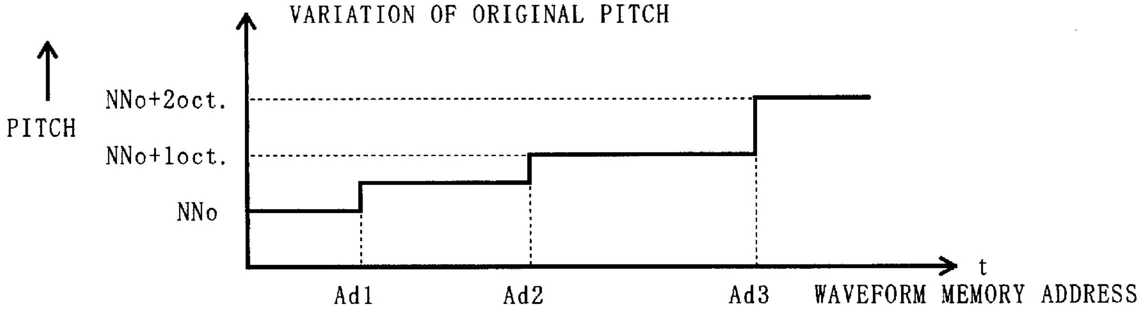
FIG. 20 is a diagram illustrating an exemplary manner in which an original pitch is varied in accordance with the waveform data compressing method of the present invention.

FIG. 20 illustrates, as exemplary variations of original pitch OP, relationships between pitches detected when the waveform sample data are read out from the waveform memory and reproduced at a fixed reproducing rate of 48 k samples per second and read addresses of the waveform memory. In FIG. 20, "NNO" represents a pitch of a note sounded at the time of recording, an address range before address Ad1 is one for reading out the waveform sample data formed up to time point t1 of FIG. 19, an address range from address Ad1 to address Ad2 is one for reading out the waveform sample data formed from time point t1 to time point t2 of FIG. 19, an address range from address Ad2 to address Ad3 is one for reading out the waveform sample data formed from time point t2 to time point t3 of FIG. 19, and an address range after address Ad3 is one for reading out the waveform sample data formed after time point t3 of FIG. 19.

What is shown in FIG. 20 is an instance where the fixed reproducing rate is 48 kHz equivalent to the highest sampling frequency Fs used during the waveform data recording, and because of the use of such a fixed reproducing rate, the waveform sample data read out from the addresses range before address Ad1 will have a pitch equivalent to the pitch NNO of the note sounded at the time of recording. If one period of the waveform data at point "a" of FIG. 6 is equivalent to 100 samples, then the pitch will be 48 kHz÷100=480 Hz. The waveform sample data read out from the address range from address Ad1 to address Ad2 will have a pitch that is $\frac{3}{2}$ of the pitch NN0 because they are reproduced at a fixed reproducing rate that is $\frac{3}{2}$ of the rate used at the time of recording. Namely, the pitch will be 480 Hz÷($\frac{3}{2}$)=720 Hz.

Further, the waveform sample data read out from the address range from address Ad2 to address Ad3 will have a pitch of 960 Hz that is twice as high as the pitch NNO because they are reproduced at a fixed reproducing rate that is twice as high as the rate used at the time of recording. That is, the pitch of the waveform sample data read out from the address range from address Ad2 to address Ad3 is one octave higher than the pitch NNO (NNO+1 oct.). Similarly, the waveform sample data read out from the address range after Ad3 will have a pitch of 1,920 Hz that is 22 times as high as the pitch NNO because they are reproduced at a fixed reproducing rate that is $2^2$ as high as the rate used at the time of recording. That is, the pitch of the waveform sample data read out from the address range after address Ad3 is two octave higher than the pitch NNO (NNO+2 oct.).

If waveform sample data are recorded with the sampling frequency Fs changed during formation of a tone as shown in FIG. 19 and the thus-recorded waveform sample data are reproduced at a fixed reproducing rate, the reproduced waveform sample data will undesirably vary in pitch during sounding of the tone in a manner as shown in FIG. 20. Thus, it is necessary to control the sample data readout from the waveform memory so as to prevent the pitch variations of the reproduced waveform sample data.

To this end, the pitch variation rate as shown in FIG. 20 is output, during recording of the waveform data, as original pitch variation control data to be used for generating F numbers, and the original pitch variation control data are stored in a control section of an electronic musical instrument as will be later described in detail. If in this case, the original pitch variation control data are data expressed in cents, a necessary pitch controlling process may be significantly simplified. The original pitch variation control data are control data to synthesize a variation curve of the original pitch OP as shown in FIG. 20, and in this case, they specify variation timing Ad1, Ad2, . . . and pitch values NNO, NN(720 Hz), NNO+1 oct., . . . .

Figure 21:
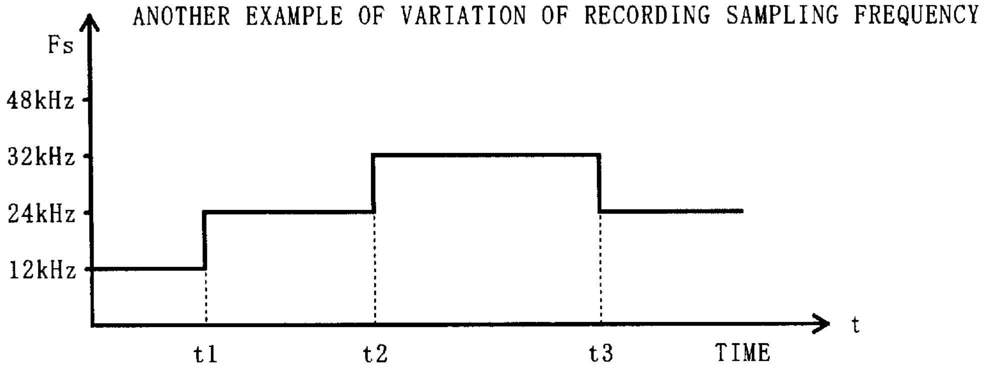
FIG. 21 is a diagram illustrating another exemplary manner in which the recording sampling frequency is varied in accordance with the waveform data compressing method of the present invention.

FIG. 21 illustrates an exemplary manner in which the sampling frequency Fs is varied during recording of waveform data for complete sounding of a single tone having a tone color that affords an effect of gradually increasing brightness.

In the illustrated example, the waveform data have highest harmonic components for a period from time point t2 to time point t3, and in this period, the sampling frequency Fs is maintained at the highest 48 kHz. The sampling frequency Fs is set to 12 kHz for a period from the sounding start point to time point t1, then set to 24 kHz for a period from time point t1 to time point t2, and restored to 24 kHz after time point t3.

If waveform sample data are recorded with the sampling frequency Fs changed at intermediate points of a tone and the thus-recorded waveform sample data are reproduced at a fixed reproducing rate, the pitch of the reproduced waveform sample data will undesirably differ from the recording pitch as mentioned above. Thus, also in this case, the pitch variation rate of the tone different in form from the foregoing is output, during recording of the waveform data, as original pitch variation control data to be used for generating F numbers, and the original pitch variation control data are stored in the control section of the electronic musical instrument.

Figure 22:
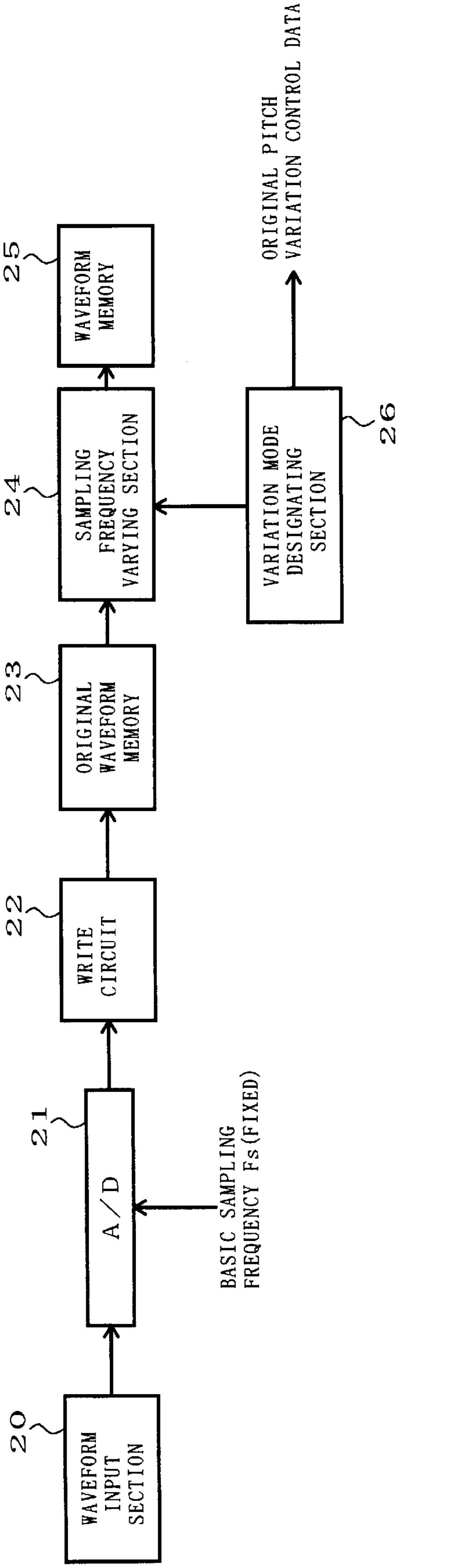
FIG. 22 is a block diagram illustrating an exemplary arrangement for effecting waveform preparations to record, into a waveform memory, waveform sample data in accordance with the waveform data compressing method of the present invention.

FIG. 22 is a block diagram illustrating an exemplary arrangement for effecting waveform preparations to record, into the waveform memory, waveform data that are sampled while varying the recording sampling frequency Fs.

In the illustrated example, waveform data introduced via a waveform input section 20 such as a microphone are converted into digital signal by an A/D converter 21. Specifically, in this example, the A/D converter 21 samples the introduced analog waveform data with a fixed highest sampling frequency Fs (e.g., 48 kHz) and converts them into digital waveform sample data. The original waveform sample data converted by the A/D converter 21 into digital representation with the fixed sampling frequency Fs are written into an original waveform memory 23 by means of a memory write circuit 22.

Then, the original waveform sample data are read out from the original waveform memory 23 and the sampling frequency is varied by a sampling frequency varying section 24. Namely, in the sampling frequency varying section 24, the waveform sample data are resampled in such a manner to lower the sampling frequency Fs, after limiting the frequency band via a low-pass filter (LPF) so that occurrence of aliasing noise is effectively avoided even though the frequency Fs is lowered.

The variation of the sampling frequency Fs during formation of a tone is effected in the sampling frequency varying section 24 in such a mode as shown in FIGS. 19 and 21, and a mode of varying the sampling frequency Fs, i.e., how and at which timing of the waveform data the sampling frequency should be varied, is designated by a variation mode designating section 26. The waveform sample data, having been changed by the sampling frequency varying section 24 to the sampling frequency designated by the variation mode designating section 26, are written into the waveform memory 25 which can be used directly in the electronic musical instrument according to the present embodiment.

If the thus-written waveform sample data are reproduced at a fixed reproducing rate, the reproduced waveform sample data will undesirably cause variation in pitch during sounding of the tone. Because, as seen from FIGS. 19 and 20, the pitch varies in accordance with the designation by the variation mode designating section 26, there are generated original pitch variation control data corresponding to the designation by the designating section 26. The original pitch variation control data comprise variation values in cents and preset in the electronic musical instrument or waveform reproducing device that reads out the waveform sample data from the waveform memory 25 for reproduction.

Figure 23:
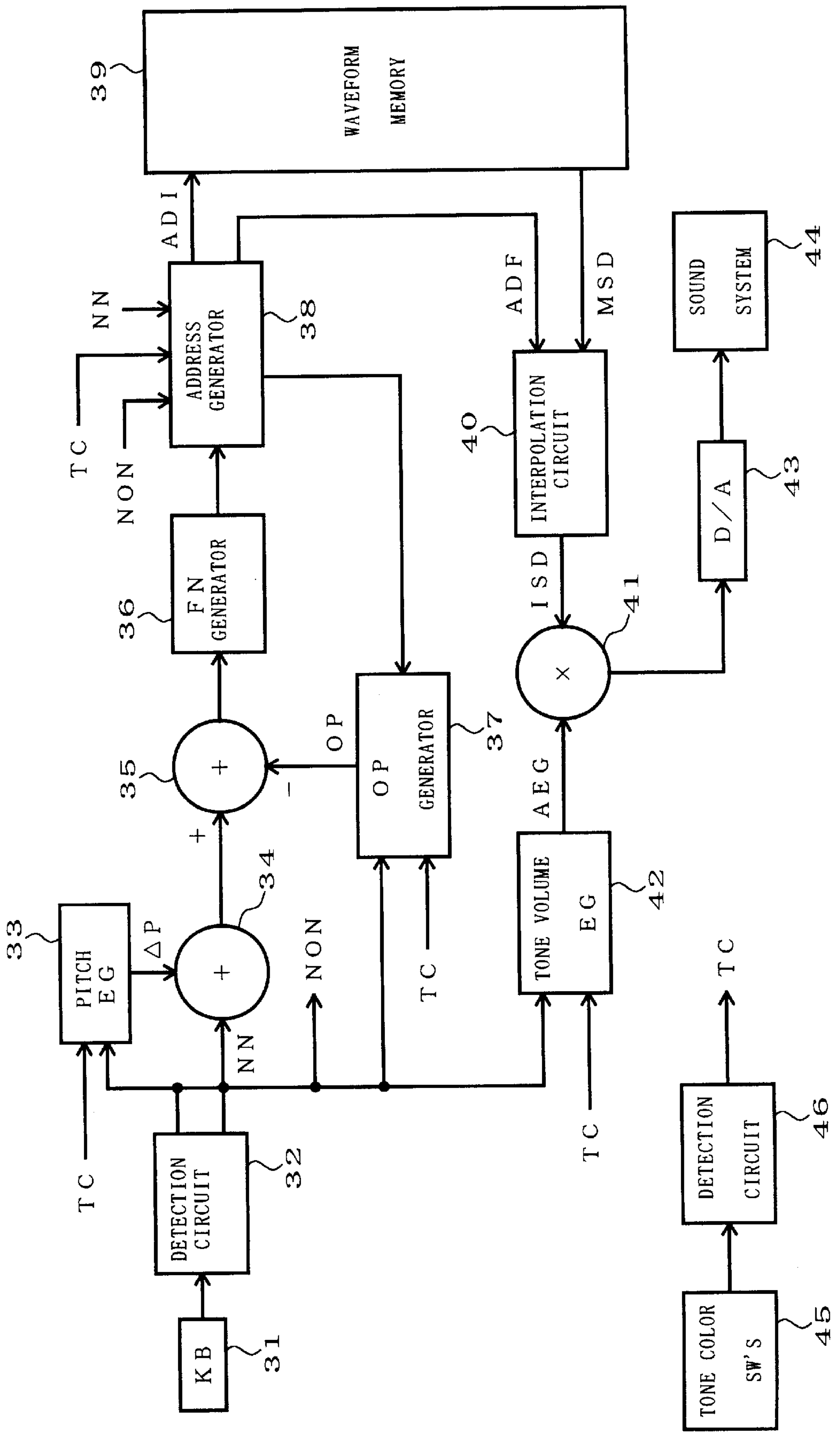
FIG. 23 is a block diagram illustrating a general structure of an electronic musical instrument including the waveform memory in which waveform data are recorded in compressed form according to the waveform data compressing method of the present invention.

FIG. 23 is a block diagram illustrating a general structure of the electronic musical instrument including the waveform memory in which waveform data are recorded in compressed form according to the waveform data compressing method of the present invention. For simplicity of description, the electronic musical instrument is assumed to generate a single tone at a time.

In the illustrated example, the electronic musical instrument comprises: a keyboard (KB) 31 operated by a human player; a detection circuit 32 for detecting a note-on event (NON) and note number (NN) in cents of an operated or depressed key on the keyboard 33; a pitch envelope generator (pitch EG) 33 for, in response to passage of time from the occurrence of the note-on event NON detected by the detection circuit 32, generating a pitch envelope waveform ΔP expressed in cents to vary the pitch of a tone in accordance with a selected tone color number TC; and an adder 34 for adding the pitch envelope waveform ΔP from the pitch envelope generator 33 to the note number NN detected by the detection circuit 32.

The electronic musical instrument further comprises: an original pitch (OP) generator 37 for generating original pitch data OP on the basis of the above-mentioned original pitch variation control data expressed in cents; a subtracter 35 for subtracting the generated original pitch data OP from the note number output from the adder 34 after having been added with the pitch envelope waveform (i.e., NN+ΔP); and a frequency number (FN) generator 36 for, in accordance with a modified note number from the subtracter 35 (i.e., NN+ΔP−OP), generating a frequency number (FN) proportional to a pitch of a tone to be generated. The original pitch generator 37 has stored therein a plurality of the original pitch variation control data corresponding to a plurality of waveform data to be stored in the waveform memory 39, and the generator 37 generates the original pitch data OP by use of the original pitch variation control data corresponding to a waveform to be read out from the waveform memory 39 in response to the tone color number TC and note number NN.

An address generator 38 selects a waveform from among those stored in the waveform memory in accordance with the tone color number TC and key range of the note number NN, and it outputs the start address of the selected waveform as a first read address at the timing of the note-on ON event. Then, the address generator 38 increments the read address at a rate corresponding to a supplied F number. From the waveform memory 39 having stored therein the waveform data as compressed according to the waveform data compressing method of the present invention, waveform sample data MSD is read out in response to the integer portion of the read address generated by the address generator 38. An interpolation circuit 40 provides sample data ISD that is interpolated in response to the decimal portion of the generated read address using the waveform sample data successively read out from the waveform memory 39. Further, a multiplier 41 multiplies the interpolated sample data ISD from the interpolation circuit 40 by a tone volume envelope waveform AEG. The tone volume envelope waveform AEG indicates tone volume variations in the tone corresponding to the tone color number TC, and is generated by a tone volume envelope generator 42 in response to the timing of the note-on event NON.

At a fixed reproducing rate, a D/A converter 43 converts into analog tone data the digital tone data (i.e., interpolated sample data ISD multiplied by the tone volume envelope waveform AEG) output from the multiplier 41. Further, a sound system 44 audibly reproduces the analog tone signal supplied from the D/A converter 43. The multiplier 41 outputs digital tone data for each timing when the D/A converter effects the analog conversion at the fixed reproducing rate (fixed sampling frequency). A block denoted by reference numeral 45 represents a plurality of tone color switches (SW) each provided for the user to select a desired color of a tone to be generated, and a block denoted by reference numeral 46 is a detection circuit for detecting the user operation of one of the tone color switches so as to output a tone color number TC corresponding to the user selected tone color.

The electronic musical instrument operates in the following manner. When the player depresses any one of the keys on the keyboard 31, the detection circuit 32 detects the depressed key to generate and provide the note number NN of the depressed key and note-on signal NON to the pitch envelope generator 33, tone volume envelope generator 42, original pitch generator 37 and address generator 38. In response to this, the pitch envelope generator 33 and tone volume envelope generator 42 start generating pitch envelope waveform ΔP and tone volume envelope waveform AEG, respectively, the original pitch generator 37 generates original pitch data OP, and the address generator 38 a read address composed of an integer portion ADI and decimal portion ADF.

Assume here that waveform data are pre-recorded in the waveform memory 39 with the sampling frequency Fs varied in the manner shown in FIG. 19 and that the player has designated a key of the same pitch as of the recorded waveform data.

In this case, the original pitch data generator 37 generates original pitch data OP expressed in the same cent value as the note number NN output from the detection circuit 32. Here, a data value output from the subtracter 5 (i.e., NN−OP) is approximately "0" cent if a pitch envelope waveform ΔP far smaller than the note number NN is ignored. Upon receipt of the "0" cent data, the frequency number generator 36 outputs "1" as an F number.

The address generator 38, by accumulating each F number output from the frequency number generator 36, a read address composed of an integer portion ADI and decimal portion ADF. The integer portion ADI of the read address increments by one for each sampling period of the D/A converter from the note-on timing, like SD, SD+1, SD+2, SD+3, . . . if the start address is "SD", while the decimal portion ADF of the read address is constantly maintained at "0".

Each time the integer portion ADI is given to the waveform memory 39, the stored waveform sample data is read out from the memory 39. Because the decimal portion ADF of the read address is "0", the read-out waveform sample data MSD is passed through the interpolation circuit 40 to the multiplier 41, which in turn multiples the sample data MSD by the tone volume envelope waveform AEG and the resultant multiplied data to the D/A converter 43. The D/A converter 43 converts the waveform sample data MSD into an analog tone signal at a fixed reproducing rate, and the analog tone signal is audible reproduced or sounded through the sound system 44.

Because the individual integer portions ADI are generated as successive addresses, all the recorded waveform sample data are read out from the waveform memory 39, and the waveform data reproduced at the fixed reproducing rate will be of the same pitch as when recorded.

When the player depresses a key of a note name different from the recorded note name, a note number NN corresponding to the note name and octave code of the depressed key is output from the detection circuit 32 to the frequency number generator 36 (for example, where a key higher than the recorded pitch by a whole tone is depressed, the detection circuit 32 outputs a note number NN incremented by 200 cents). The key number generator 36 in turn generates an F number corresponding to the depressed note name and octave code (e.g., higher than the recorded pitch by a whole tone) and passes the generated F number to the address generator 38. On the basis of a read address generated this time, waveform sample data MSD is read out from the waveform memory 39 to be subjected to an interpolation process. In this interpolation process, interpolation such as linear interpolation is effected between successive waveform sample data MSD in accordance with the decimal portion SDF.

The thus-interpolated sample data ISD is multiplied via the multiplier 41 by the tone envelope waveform and passed to the D/A converter, where the sample data ISD is restored to analog waveform data at the fixed reproducing rate. The restored waveform data will present a pitch corresponding to the F number (e.g., higher than the recorded pitch by a whole tone).

The address generator 31 supplies the generated read address to the original pitch generator 37, which, on the basis of original pitch control data selected in response to the tone color number TC and note number NN, detects when the read address arrives address Ad1, Ad2 or Ad3. Thus, by such detection, the original pitch generator 37 sequentially changes the value of the original pitch data OP like NNO→NN(720 Hz)→NNO+1 oct., . . . .

In the above-mentioned manner, the variation curve of the original pitch data OP as shown in FIG. 20 is reproduced in response to the read addresses. At address locations Ad1 and Ad2, for example, the original pitch generator 37 will generate original pitch data OP incremented from the last data OP by 700 cents and another 500 cents and supply these incremented original pitch data OP to the subtracter 35. In turn, at an address location past Ad2, 1,200 cents are subtracted from the note number added with the pitch envelope ΔP output from the adder 34. Because 1,200 cents correspond to one octave, a note number (NN+ΔP−OP) one octave lower than the F number generated at the point preceding Ad1 is output at address location Ad2 and then supplied to the FN generator 36. Accordingly, the FN generator 36 generates an F number corresponding to a pitch that is one octave lower than the F number generated at the time earlier than Ad1, so that the address generator 38 generates a read address incremented at a rate corresponding to the F number.

The integer portion ADI of the read address is supplied to the waveform memory 39 so that the recorded waveform sample data is read out, one sample data at each read timing. If, for example, the F number to address Ad1 is "1", the F number is made "0.5" from address Ad2, so that the integer address ADI of the read address generated from the address generator 38 changes like 0, 1, 1, 2, 2, . . . while the decimal portion ADF changes like 0.5, 0, 0.5, 0, . . . (the start address is not considered here). The integer address ADI is supplied to the waveform memory 39 to read out waveform sample data MSD therefrom, and the read-out sample data MSD is supplied to the interpolation circuit 40 for the interpolation based on the decimal portion ADI.

At and after address Ad2, the waveform sample data are read out from the waveform memory 39 every sampling cycle and interpolated by the interpolation circuit 40 in accordance with the individual decimal portions ADF. However, because the amount of the waveform sample data recorded in the waveform memory 39 at and after address Ad2 is, from the beginning, half the amount recorded up to address Ad1 in the time axis (address) direction, the recorded waveform sample data are read out from the waveform memory 39, one sample every other readout timing. This compensates for the halved sampling frequency Fs used for recording, so that the waveform sample data can be read out from the waveform memory 39 at the same pitch as when recorded.

Then, the interpolated sample data ISD from the interpolation circuit 40 is multiplied via the multiplier 41 by the tone volume envelope waveform AEG generated by the tone volume envelope generator 42 and is converted via the D/A converter 43 into analog representation at the fixed reproducing rate.

Figure 24:
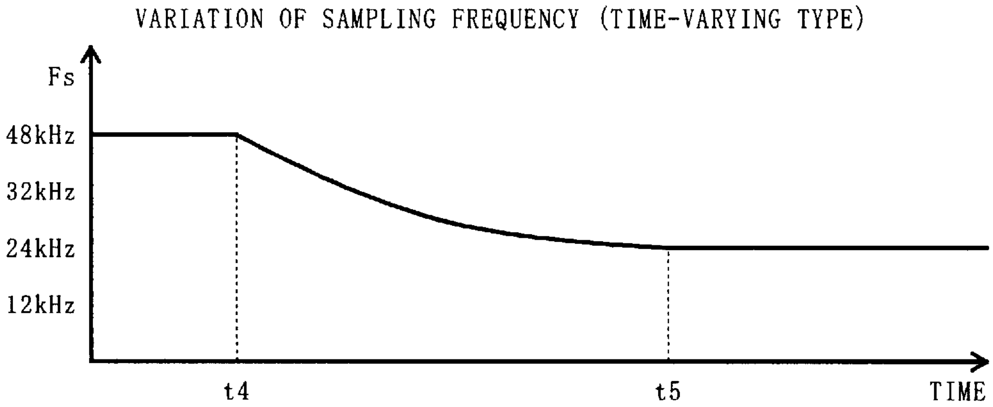
FIG. 24 is a diagram illustrating still another exemplary manner in which the recording sampling frequency is varied in accordance with the waveform data compressing method of the present invention.

It should be noted here that when compressing the waveform data, the sampling frequency Fs for recording waveform data from the start to end of a tone can be varied not only in a stepwise fashion as shown in FIG. 19 but also in a consecutive gradual fashion as shown in FIG. 24. In FIG. 24, the sampling frequency Fs is varied to lower consecutively from 48 kHz at time point t4 to 24 kHz at time point t5, and such a continuous variation also allows the waveform data to be recorded in the waveform memory in compressed form. In this case, the original pitch data OP expressed in cents is set to vary linearly from the start to end of the tone. That is, when the waveform data read out from the waveform memory are reproduced at the fixed reproducing rate, the pitch of the reproduced waveform data varies linearly from address Ad4 to address Ad5 along the cent axis as shown in FIG. 25.

Figure 25:
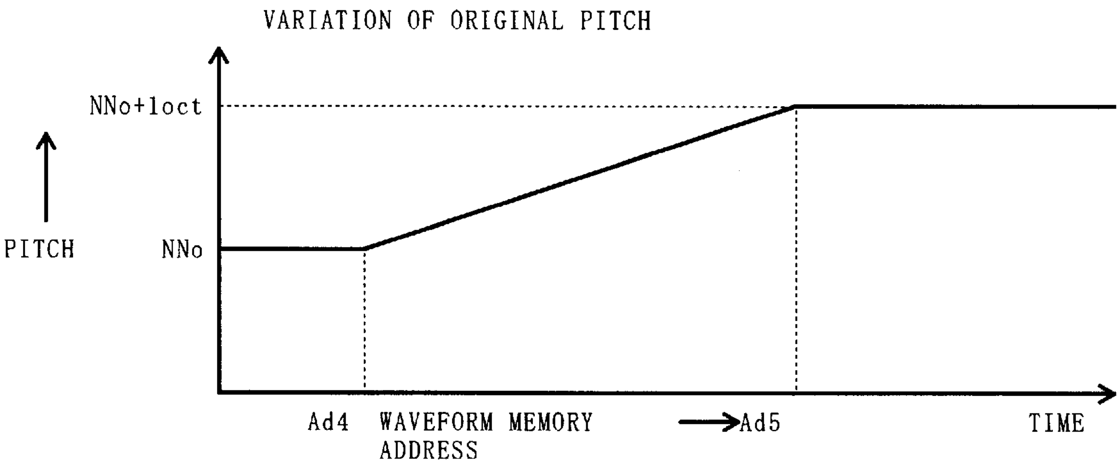
FIG. 25 is a diagram illustrating a manner in which an original pitch is varied in accordance with the waveform data compressing method of the present invention.

Thus, where waveform data are recorded with the sampling frequency varied as shown in FIG. 25, the original pitch generator 37 of the electronic musical instrument shown in FIG. 23 only needs to output original pitch data OP varying in a broken-line fashion and hence can be substantially simplified in construction.

In the arrangement for recording waveform sample data in the waveform memory in accordance with the waveform data compressing method of the present invention and the electronic musical instrument including such a waveform memory having waveform sample data recorded therein, the functions denoted in blocks can of course be implemented by hardware components, but may also be implemented by a MPU (micro processor unit) or a DSP (digital signal processor).

According to the present invention described so far, the sampling frequency is raised for the attack portion of a tone to be recorded where the waveform data contain high frequency components and lowered for the sustain portion etc. where the waveform data contain not so high frequency components, so that waveform sample data to be recorded in the waveform memory can be effectively reduced in quantity and compressed to a substantial degree. As a result, the present invention can reduce a storage capacity of the waveform memory and use the memory with enhanced efficiency.

What is claimed is:

1. A tone generating method for forming tone waveform samples which is performed by an arithmetic processing device, said method comprising the steps of:

performing waveform formation calculations to form a plurality of waveforms which correspond to a plurality of tone generating channels;

performing pitch control to control a pitch of each of said plurality of waveforms formed in each of said tone generating channels, independently for each of said plurality of tone generating channels; and performing resolution control to control a resolution of said waveform formation calculations independently for each of said plurality of tone generating channels in accordance with a character of each of said plurality of waveforms to be formed in each of said channels and the importance of each of said channels relative to other of said channels, wherein said resolution of each of said waveforms in each of said channels is controlled independently of other said channels.

2. A tone generating method for forming tone waveform samples performed by an arithmetic processing device, said method comprising the steps of:

performing waveform formation calculations to form a waveform; and performing resolution control to vary a resolution of said waveform formation calculations during the calculations in accordance with a time-varying ratio of harmonic content of said waveform, wherein said waveform is formed with said resolution of said waveform formation calculations which is varied during generation of a tone.

3. A tone generating method wherein tone forming calculations are performed for a plurality of tone generating channels so as to form waveform data of a plurality of tones corresponding to the channels, said method comprising:

a tone control step of generating first control data for, for each of the tone generating channels, designating a tonal characteristic of the waveform data to be formed in said channel;

a calculation control step of generating second control data for, for each of the tone generating channels, designating a specific number of tone samples to be formed in said channel per unit time;

a tone formation step of, for each of the tone generating channels, arithmetically forming waveform data of the tone corresponding to said channel in accordance with the tonal characteristic designated by said first control data and at a sample forming rate designated by said second control data; and a step of generating tones on the basis of the waveform data formed in said tone formation step for the plurality of tone generating channels.

4. A tone generating method as defined in claim 3 wherein said calculation control step generates said second control data in correspondence with the tonal characteristic of the waveform data to be formed in each of the tone generating channels.

5. A tone generating method as defined in claim 3 wherein said calculation control step varies said second control data to be generated, in correspondence with a time-variation in the tonal characteristic of the waveform data to be formed in each of the tone generating channels.

6. A tone generating method as defined in claim 3 wherein said first control data includes pitch information that designates a pitch of a tone to be generated in each of the tone generating channels, and wherein said tone formation step converts the pitch information of each of the channels into a phase variation rate of the tone to be generated, in accordance with the sample forming rate designated by said second control data.

7. A tone generating method for simultaneously generating at least two tones, comprising:

a first formation step of forming samples of a first tone waveform containing a great number of high-frequency components at a forming rate of N samples per unit time;

a second formation step of forming samples of a second tone waveform containing a small number of high-frequency components at a forming rate of M samples per unit time, where M is smaller than N;

a step of subjecting the M samples of said second tone waveform to an interpolation operation, so as to provide N samples of said second tone waveform;

a mix step of sequentially adding the N samples of said first second tone waveform and the N samples of said second tone waveform sample by sample, so as to provide N samples of a mixed tone waveform; and a step of generating tones on the basis of the mixed tone waveform provided by said mix step.

8. A tone generating method wherein tone forming calculations are performed for a plurality of tone generating channels so as to form waveform data of a plurality of tones corresponding to the channels, said method comprising:

a division step of dividing the plurality of tone generating channels into first and second groups;

a first formation step of forming N samples of a tone waveform per unit time for each of the channels of said first group and sequentially adding the N samples between the channels, so as to provide N samples of a first mixed waveform;

a second formation step of forming M samples of a tone waveform per unit time for each of the channels in said second group and sequentially adding the M samples between the channels, so as to provide M samples of a second mixed waveform, where M is smaller than N;

a step of subjecting the M samples of said second tone waveform to an interpolation operation, so as to provide N samples of said second tone waveform;

a mix step of sequentially adding the N samples of said first second tone waveform and the N samples of said second tone waveform sample by sample, so as to provide N samples of a mixed tone waveform; and a step of generating tones on the basis of the mixed tone waveform provided by said mix step.

9. A method for forming waveform sample data corresponding to a desired sound comprising the steps of:

forming waveform sample data in a plurality of consecutive time sections; and designating a sampling frequency for each of said plurality of consecutive time sections in accordance with harmonic components contained in a sound to be formed, wherein for each of a plurality of time sections, waveform sample data are formed with said sampling frequency which has been designated for each of said time sections.

10. A method wherein a sound to be generated is allocated a plurality of consecutive time sections and waveform sample data are formed for each of the time sections, comprising the steps of:

defining a time resolution of waveform samples to be formed in each of the time sections independently of other of said time sections;

performing arithmetic operations to form waveform sample data for each of the time sections with the time resolution defined for each of said time sections; and outputting the waveform sample data formed by said step of performing arithmetic operations.

11. A method as defined in claim 10 wherein said step of defining a time resolution further comprises the step of forming a specific number of waveform samples corresponding to the defined resolution using an optional time within the time section, and wherein said step of outputting further comprises the steps of buffering temporarily the waveform sample data formed using the optional time and reading out the buffered waveform sample data at a desired reproduction rate.

12. A method for forming waveform sample data corresponding to desired sounds in a plurality of channels, comprising the steps of:

forming waveform sample data in each of the channels at a sampling rate determined independently for each of the channels, wherein one of the sampling rates determined is a predetermined output sample rate;

mixing the waveform sample data formed in one or more of the channels using a same sampling rate other than the predetermined output sample rate, so that mixed waveform sample data is provided for each different one of the sampling rates other than the predetermined output sample rate;

resampling the mixed waveform sample data for each different one of the sampling rates other than the output sample rate, so as to provide resampled waveform sample data having the output sample rate;

mixing the resampled waveform sample data and the waveform sample data of the output sample rate, to provide output waveform sample data having the output sample rate; and outputting the output waveform sample data having the output sample rate.

13. A method as defined in claim 12 wherein said step of outputting includes adding together the resampled waveform sample data of the individual channels.

14. A method as defined in claim 12 wherein said step of outputting includes interpolating between the waveform sample data.

15. A method as defined in claim 12 wherein the sampling rate for each of the channels is variably determined depending on a time section of the sound to be generated in said channel.

16. A sound generating device comprising:

an arithmetic processing section for dividing a sound to be generated into a plurality of time sections, and independently for each of said plurality of time sections, defining a resolution of waveform sample to be formed in each of said plurality of time sections, so as to form waveform sample data corresponding to each of said plurality of time sections with the resolution defined for each of said plurality of time sections; and an output section for outputting the waveform sample data formed by said arithmetic processing section, said output section variably controlling a time width of each of the samples.

17. A sound generating device as defined in claim 16 wherein said arithmetic processing section forms waveform sample data of a sound to be generated in each of the channels, with the resolution defined independently for said channel.

18. A machine readable recording medium containing a group of instructions to cause said machine to implement a sound generating method, said method performing tone forming calculations for a plurality of tone generating channels so as to form waveform data of a plurality of tones corresponding to the channels, said method comprising:

a tone control step of generating first control data for, for each of the tone generating channels, designating a tonal characteristic of the waveform data to be formed in said channel;

a calculation control step of generating second control data for, for each of the tone generating channels, designating a specific number of tone samples to be formed in said channel per unit time;

a tone formation step of, for each of the tone generating channels, arithmetically forming waveform data of the tone corresponding to said channel in accordance with the tonal characteristic designated by said first control data and at a sample forming rate designated by said second control data; and a step of generating tones on the basis of the waveform data formed in said tone formation step for the plurality of tone generating channels.

19. A machine readable recording medium containing a group of instructions to cause said machine to implement a sound generating method, said method simultaneously generating at least two tones, said method comprising:

a first formation step of forming samples of a first tone waveform containing a great number of high-frequency components at a forming rate of N samples per unit time;

a second formation step of forming samples of a second tone waveform containing a small number of high-frequency components at a forming rate of M samples per unit time, where M is smaller than N;

a step of subjecting the M samples of said second tone waveform to an interpolation operation, so as to provide N samples of said second tone waveform;

a mix step of sequentially adding the N samples of said first second tone waveform and the N samples of said second tone waveform sample by sample, so as to provide N samples of a mixed tone waveform; and a step of generating tones on the basis of the mixed tone waveform provided by said mix step.

20. A machine readable recording medium containing a group of instructions to cause said machine to implement a sound generating method, said method performing tone forming calculations for a plurality of tone generating channels so as to form waveform data of a plurality of tones corresponding to the channels, said method comprising:

a division step of dividing the plurality of tone generating channels into first and second groups;

a first formation step of forming N samples of a tone waveform per unit time for each of the channels in said first group and sequentially adding the N samples between the channels, so as to provide N samples of a first mixed waveform;

a second formation step of forming M samples of a tone waveform per unit time for each of the channels in said second group and sequentially adding the M samples between the channels, so as to provide M samples of a second mixed waveform, where M is smaller than N;

a step of subjecting the M samples of said second tone waveform to an interpolation operation, so as to provide N samples of said second tone waveform;

a mix step of sequentially adding the N samples of said first second tone waveform and the N samples of said second tone waveform sample by sample, so as to provide N samples of a mixed tone waveform; and a step of generating tones on the basis of the mixed tone waveform provided by said mix step.

21. A waveform data compressing method comprising:

an input step of inputting a waveform lasting for a predetermined period;

a control step of varying a recording sampling frequency during said predetermined period;

a sampling step of sampling the waveform by use of said recording sampling frequency so as to obtain waveform data; and a write step of sequentially writing into a memory the waveform data obtained by said sampling step.

22. A waveform data compressing method as defined in claim 21 wherein the recording sampling frequency is varied stepwise at predetermined timing during the predetermined period.

23. A waveform data compressing method as defined in claim 21 wherein the recording sampling frequency is varied gradually at predetermined timing during the predetermined period.

24. A waveform data compressing method comprising:

an input step of inputting a waveform lasting for a predetermined period;

a control, step of varying a recording sampling frequency during said predetermined period;

a sampling step of sampling the waveform by use of the recording sampling frequency so as to obtain waveform data;

a recording step of sequentially recording into a waveform memory the waveform data obtained by said sampling step;

a designation step of designating a reproducing rate;

a generation step of generating variation data corresponding to a pitch variation occurring in the waveform data recorded in the waveform memory due to a variation of the recording sampling frequency by said control step;

a modification step of modifying the reproducing rate designated by said designation step with the variation data; and a reproduction step of reading the waveform memory at a rate corresponding to the reproducing rate modified by said modification step.

25. A waveform data compressing method as defined in claim 24 wherein where the waveform data are read out at a fixed rate, said variation data is data indicative of a frequency in a logarithmic region represented by the waveform data.

26. A waveform data compressing method as defined in claim 25 wherein said modification step performs addition or subtraction between the reproducing rate and the variation data.

27. A machine readable recording medium containing a group of instructions to cause said machine to implement a sound generating method, said method comprising:

an input step of inputting a waveform lasting for a predetermined period;

a control step of varying a recording sampling frequency during said predetermined period;

a sampling step of sampling the waveform by use of said recording sampling frequency so as to obtain waveform data; and a write step of sequentially writing into a memory the waveform data obtained by said sampling step.

28. A machine readable recording medium containing a group of instructions to cause said machine to implement a sound generating method, said method comprising:.

an input step of inputting a waveform lasting for a predetermined period;

a control step of varying a recording sampling frequency during said predetermined period;

a sampling step of sampling the waveform by use of the recording sampling frequency so as to obtain waveform data;

a recording step of sequentially recording into a waveform memory the waveform data obtained by said sampling step;

a designation step of designating a reproducing rate;

a generation step of generating variation data corresponding to a pitch variation occurring in the waveform data recorded in the waveform memory due to a variation of the recording sampling frequency by said control step;

a modification step of modifying the reproducing rate designated by said rate designation step with the variation data; and a reproduction step of reading the waveform memory at a rate corresponding to the reproducing rate modified by said modification step.

* * * * *